US008678231B2

(12) United States Patent
Yuyama et al.

(10) Patent No.: US 8,678,231 B2
(45) **Date of Patent: *Mar. 25, 2014**

(54) MEDICINE DISPENSING DEVICE

(75) Inventors: Shoji Yuyama, Osaka (JP); Yasuhiro Shigeyama, Osaka (JP); Takayuki Fujikawa, Osaka (JP); Hiroyuki Kanda, Osaka (JP); Shigeyuki Sakai, Osaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 839 days.

This patent is subject to a terminal disclaimer.

(21) Appl. No.: 12/703,000

(22) Filed: Feb. 9, 2010

(65) Prior Publication Data

US 2010/0198398 A1 Aug. 5, 2010

Related U.S. Application Data

(63) Continuation of application No. 11/597,004, filed as application No. PCT/JP2005/009068 on May 18, 2005, now Pat. No. 7,686,184.

(30) Foreign Application Priority Data

May 19, 2004 (JP) ................................ 2004-149238
Oct. 15, 2004 (JP) ................................ 2004-302139
Feb. 25, 2005 (JP) ................................ 2005-051293

(51) Int. Cl.
*B23Q 7/04* (2006.01)

(52) U.S. Cl.
USPC ........... 221/210; 221/217; 221/219; 221/262; 221/251; 221/131

(58) Field of Classification Search
USPC .................. 221/217, 219, 131, 210, 251, 262
See application file for complete search history.

(56) References Cited

U.S. PATENT DOCUMENTS 463,256 A 11/1891 Side
935,472 A 9/1909 Demaine
(Continued)

FOREIGN PATENT DOCUMENTS

CH 412251 4/1966
JP 62-136404 6/1987
(Continued)

OTHER PUBLICATIONS

Office Action of related U.S. Appl. No. 11/665,285, dated Aug. 19, 2010.

(Continued)

*Primary Examiner* — Michael K Collins
(74) *Attorney, Agent, or Firm* — Patterson Thuente Pedersen, P.A.

(57) ABSTRACT

A medicine dispensing device capable of appropriately dispensing medicines independent of their form and having a compact structure. The medicine dispensing device has a device body (1) and a medicine conveyance member (3) for conveying, on one by one basis, medicines (D) arranged in rows in the device body (1). The medicine conveyance member (3) has a medicine holding member (40) reciprocatingly moving in the horizontal and vertical directions. The medicine holding member (40) has a support member (42), a forwardly/backwardly moving member (43) reciprocatingly moving in the forward and backward direction of the device body (1) while being supported by the support member (42), and a holding member (44) supported by the forwardly/backwardly moving member (43) so as to swing between a vertical position and a horizontal position and having a pair of holding sections (54) capable of holding a medicine (D).

10 Claims, 25 Drawing Sheets

(56) References Cited

U.S. PATENT DOCUMENTS

| | | | | |
|---|---|---|---|---|
| 1,379,659 | A | 5/1921 | Talbot | |
| 1,422,975 | A | 7/1922 | Holtzclaw | |
| 1,638,181 | A | 8/1927 | Bell | |
| 2,287,005 | A | 7/1940 | Greaves | |
| 2,222,887 | A | 11/1940 | Willey | |
| 2,305,348 | A | 12/1942 | King | |
| 2,443,862 | A | 6/1948 | Justus | |
| 3,715,148 | A | 2/1973 | Beals | |
| 4,114,965 | A | 9/1978 | Oye et al. | |
| 4,303,162 | A | 12/1981 | Suttles | |
| 4,518,208 | A | 5/1985 | Marder | |
| 4,546,901 | A * | 10/1985 | Buttarazzi | 221/10 |
| 4,588,237 | A | 5/1986 | Marder | |
| 4,765,581 | A | 8/1988 | Wallace et al. | |
| 4,836,390 | A | 6/1989 | Polvere | |
| 5,067,780 | A | 11/1991 | Rickard | |
| 5,080,258 | A | 1/1992 | Hinterreiter | |
| 5,240,125 | A | 8/1993 | Kunz | |
| 5,240,126 | A | 8/1993 | Foster et al. | |
| 5,263,596 | A * | 11/1993 | Williams | 221/153 |
| 5,302,014 | A | 4/1994 | Hobson | |
| 5,337,919 | A * | 8/1994 | Spaulding et al. | 221/2 |
| 5,351,839 | A | 10/1994 | Beeler | |
| 5,468,110 | A * | 11/1995 | McDonald et al. | 414/273 |
| 5,533,799 | A | 7/1996 | Nickolaus, Jr. | |
| 5,791,516 | A | 8/1998 | Wittern et al. | |
| 5,873,489 | A | 2/1999 | Ide et al. | |
| 5,905,653 | A | 5/1999 | Higham et al. | |
| 6,011,999 | A | 1/2000 | Holmes | |
| 6,105,791 | A | 8/2000 | Chalson et al. | |
| 6,151,536 | A | 11/2000 | Arnold et al. | |
| 6,189,727 | B1 | 2/2001 | Shoenfeld | |
| 6,378,727 | B1 | 4/2002 | Dupius et al. | |
| 6,415,950 | B1 | 7/2002 | Robrechts | |
| 6,464,089 | B1 | 10/2002 | Rankin, VI | |
| 6,523,703 | B1 | 2/2003 | Robertson | |
| 6,556,889 | B2 | 4/2003 | Rudick et al. | |
| 6,681,149 | B2 * | 1/2004 | William et al. | 700/231 |
| 6,684,126 | B2 * | 1/2004 | Omura et al. | 700/231 |
| 6,739,476 | B2 * | 5/2004 | Shigeyama et al. | 221/172 |
| 6,742,671 | B2 * | 6/2004 | Hebron et al. | 221/9 |
| 6,866,156 | B2 | 3/2005 | Nagel et al. | |
| 6,886,699 | B2 | 5/2005 | Johnson et al. | |
| 6,915,923 | B1 | 7/2005 | Magid | |
| 7,086,560 | B2 * | 8/2006 | Shioya | 221/191 |
| 7,086,650 | B2 | 8/2006 | Fujiwara et al. | |
| 7,140,499 | B2 | 11/2006 | Burke | |
| 7,168,579 | B2 | 1/2007 | Richter et al. | |
| 7,222,748 | B2 * | 5/2007 | Holdway et al. | 221/93 |
| 7,275,796 | B2 | 10/2007 | Bochner et al. | |
| 7,293,663 | B2 | 11/2007 | Lavery et al. | |
| 7,316,328 | B2 * | 1/2008 | Yuyama et al. | 221/227 |
| 7,344,050 | B2 | 3/2008 | Robrechts | |
| 7,451,891 | B2 | 11/2008 | Carter et al. | |
| 7,686,184 | B2 * | 3/2010 | Yuyama et al. | 221/210 |
| 2004/0054629 | A1 | 3/2004 | Hunt et al. | |
| 2004/0155051 | A1 | 8/2004 | Magid | |
| 2005/0004706 | A1 * | 1/2005 | Osborne et al. | 700/240 |
| 2005/0189370 | A1 * | 9/2005 | Carter et al. | 221/123 |
| 2007/0221680 | A1 | 9/2007 | Yuyama | |
| 2007/0241122 | A1 | 10/2007 | Yuyama | |
| 2007/0267364 | A1 | 11/2007 | Barkdoll | |
| 2009/0045152 | A1 | 2/2009 | Yuyama et al. | |
| 2009/0184069 | A1 | 7/2009 | Hardy | |

FOREIGN PATENT DOCUMENTS

| | | |
|---|---|---|
| JP | 03-45766 | 4/1991 |
| JP | 03-083701 | 4/1991 |
| JP | 06-293402 | 10/1994 |
| JP | 07-215416 | 8/1995 |
| JP | 07-285613 | 10/1995 |
| JP | 10-334329 | 12/1998 |
| JP | 11-154266 | 6/1999 |
| JP | 2000-072204 | 3/2000 |
| JP | 2001-198194 | 7/2001 |
| JP | 2002-011073 | 1/2002 |
| JP | 2002-092725 | 3/2002 |
| JP | 2002-153540 | 5/2002 |
| JP | 2003-267520 | 9/2003 |

OTHER PUBLICATIONS

Japanese Office Action of JP2004-301715, dated Feb. 9, 2010.

* cited by examiner (a)

(b)

(c)

MEDICINE DISPENSING DEVICE

CROSS REFERENCE TO RELATED APPLICATIONS

This application is a continuation of U.S. application Ser. No. 11/597,004, filed Nov. 17, 2006, which is a 371 of PCT/JP05/09068, filed May 18, 2005, which application claims the benefit of priority based on JP Patent Application No. 2004-149238, filed on May 19, 2004, JP Patent Application No. 2004-302139, filed on Oct. 15, 2004, and JP Patent Application 2005-051293, filed on Feb. 25, 2005, the disclosures of which are incorporated herein by reference in their entirety.

FIELD OF THE INVENTION

The present invention relates to a medicine dispensing device, and more specifically to a medicine dispensing device that is capable of appropriately dispensing even a medicine having a special shape.

PRIOR ART

Conventionally, medicine dispensing devices have been disclosed that include a plurality of cassettes respectively storing medicines, and a dispensing transport mechanism that allow a medicine to be removed from a desired cassette containing a desired medicine, and conveys the cassette to a predetermined position (see Patent Publication 1).

In addition, a holding and transporting apparatus for transporting a container, such as a bottle, has been disclosed (see Patent Publication 2, for example), wherein a slide roll to be controlled by a guide rail is vertically movably provided above a support unit that is provided with an adjustable article mount table provided in a lower portion and that is moved by a transport chain. The slide roll is connected with a pair of left and right holding arms provided on the front side of the supporting body and bent into an obtuse angle shape through a pinion-rack mechanism, and a clamping central position of the holding arms is set constant, thereby easing the execution of processes.

Patent Publication 1: Japanese Unexamined Patent Publication No. 2000-24086

Patent Publication 2: Japanese Unexamined Patent Publication No. 11-236095

However, in the former medicine dispensing device, the medicine stored in the cassette is discharged via a conveyor. In such a configuration, a container such as a bottle storing an injection medication cannot be appropriately discharged. In addition, if the latter holding and transporting apparatus is simply employed in the former medicine dispensing device, a problem arises in that the occupied spacing is increased.

SUMMARY OF THE INVENTION

Problems to be Solved by the Invention

Accordingly, an object of the present invention is to provide a medicine dispensing device having a configuration that, regardless of the type of a medicine, is capable of appropriately dispensing the medicine and that is compact.

Means for Solving the Problems

As means to achieve the object, a medicine dispensing device includes a device body, and a medicine conveyance member that conveys medicines arranged in a plurality of lines in the device body one by one, wherein the medicine conveyance member includes a medicine holding member that reciprocatingly moves in a horizontal direction and a vertical direction; the medicine holding member including a support member, a frontward-rearward moving member that is supported by the support member and that reciprocatingly moves in forward and rearward directions of the device body, and a clamping member including a pair of clamp pieces that are supported by the frontward-rearward moving member so as to pivot between a vertical position and a horizontal position and that are capable of clamping the medicine stored in a shelf member.

In this configuration, when a horizontal guide portion is horizontally moved along a horizontal guide portion to vertically move the clamping member along the horizontal guide portion, the clamp pieces can be moved to a front portion of a desired shelf member. In addition, the frontward-rearward moving member is moved to thereby cause the clamping member to clamp a corresponding medicine, such that the medicine can be appropriately clamped in a limited spacing. Further, since the medicine is clamped simply by the clamp pieces, any type of a medicine can be appropriately removed from the shelf member. Further, similarly as described above, when the horizontal guide portion and the horizontal guide portion are used to convey the medicine to a desired position, the medicine can be dispensed in the manner the clamping member is driven to pivot to thereby change the direction of the medicine. Consequently, although spacing between the device body and the shelf member is small, the medicine can be appropriately clamped and conveyed and can be dispensed by being changed in the direction in the event of the dispensing operation.

Preferably, the clamp pieces are each configured to include an outer frame that includes an outer profile formed along an outer peripheral shape of the medicine, and a resilient support portion that is disposed in the outer frame and that press-contacts an outer periphery of the medicine. This configuration is preferable in that the clamped state of the medicine can be further stabilized.

Preferably, the device further includes storage means that stores medicine data including a size of each aforementioned medicine, and a controller unit that references medicine data stored in the storage means in accordance with prescription data to thereby perform drive control of the medicine conveyance member. In this case, the controller unit adjusts a gap between the clamp pieces in accordance with the size of the medicine contained in the medicine data stored in the storage means when the medicine conveyance member is driven and controlled to dispense the medicine in accordance with the prescription data, thereby controlling a dimension of movement when the medicine is clamped by the clamp pieces.

According to this configuration, when clamping the medicine, the gap between the clamp pieces can be reduced to a minimum value necessary to enable the clamp of the medicine. As such, the width between medicines being stored can be reduced. In addition, the amount of time for clamping the medicine by the clamp pieces can be reduced, and hence the dispensing operation can be efficiently performed.

The configuration may be such that the medicine is stored in each of the plurality of cassettes juxtaposed in the device body; and the device further includes storage means that stores a width in a juxtaposed direction of each aforementioned cassette, and a controller unit that references medicine data stored in the storage means in accordance with prescription data to thereby perform drive control of the medicine conveyance member, wherein the controller unit adjusts a gap between the clamp pieces in accordance with the width of the cassette stored in the storage means when the medicine conveyance member is driven and controlled to dispense the medicine in accordance with the prescription data, thereby reducing a dimension of movement when the medicine is clamped by the clamp pieces. Even in the configuration, similar effects can be obtained.

Preferably, the clamping member includes a pivotal plate that support the clamp pieces to move close to or away from one another and to be pivotable, and urging means that urges the pivotal plate to the vertical position, wherein the pivotal plate includes a pressure receptor portion that, when moving down the clamping member, abuts a compression portion formed in the device body to thereby cause the clamping member to rotate to the horizontal position against an urging force exerted by the urging means. This is preferable in that the clamp pieces can be driven to pivot in the simplified configuration.

The clamping member, preferably, includes a first lock member reciprocatingly movable in the horizontal direction along a projected portion formed in the device body, and a second lock member that disallows or allows the clamp pieces to pivot in accordance with the reciprocatingly movement of the first lock member. The configuration is preferable in that the operation of the clamping member can be securely performed, thereby providing high safety.

Preferably, in the device body, a spacing wherein the clamping member is movable only when being positioned in the vertical position is formed on a front side of medicines aligned and disposed, and a spacing wherein the clamping member is rotatable to the horizontal position from the vertical position is formed on a lower side of the medicines aligned and disposed in a lowest position in the device body. This is preferably in that while the dispensing operation of the medicine from the respective shelf member is smoothly performed, and the device body can be formed into a compact configuration.

Preferably, the cassette includes a fall prevention rod in a center of an end portion on a removal side of medicines; and the control means performs drive control of the medicine holding member to remove the medicine after a first medicine stored in the cassette is lifted by being clamped by the clamp pieces and is then once moved in the width direction of the cassette to thereby eliminate interference between the lifted medicine and the fall prevention rod. This is preferably in that even when medicines have a special shape that cannot be sufficiently supported only with the sidewalls of the cassette, the medicines can be prevented from falling without causing defects in the event of removal operation are caused drawbacks, in the simplified configuration and, concurrently, at low costs.

Preferably, in the cassette, thin medicines are stored in an alignment direction, and an auxiliary pusher is provided on a pusher that urges a stored medicine to the removal side, the auxiliary pusher being able to urge the medicine to the removal side while avoiding interference with a last medicine remaining in the cassette when the medicine is clamped by the clamp pieces. This is preferable in that even when medicines are of a thin type, appropriate removal thereof can be implemented with the provision of only the auxiliary pusher.

The auxiliary pusher may be integrated with the pusher, but may be provided as an independent unit. In this case, it is convenient since the auxiliary pusher can be mounted and used only when medicines to be stored in the cassette is of a thin type.

Preferably, the cassette includes a pusher that urges a stored medicine to the removal side, and on a bottom wall allowing medicines to be stored, a moving support portion that abuts the medicine and that is reciprocatingly movable.

In the configuration, before a medicine urged by the pusher falls on the removal side, the moving support portion follows and moves, thereby making it possible to maintain the medicine in the state perpendicular the bottom wall of the cassette.

Preferably, the moving support portion is configured to include an endless belt wound onto and between pulleys. This is preferable in that, while the configuration is simple and inexpensive, the state of medicines stored in the cassette can be stabilized, and a medicine after removed from the cassette can be effectively prevented from falling.

In the present invention, the front side of the device body 1 refers to a surface on the left side as viewed in the side view, FIG. 2. The horizontal direction is the direction along a horizontal guide bar 38 shown in FIG. 1, and the vertical direction is the direction along a vertical guide bar.

In addition, the forward and rearward directions are the directions along a first guide shaft 46 shown in FIGS. 7 and 8. The movement is performed in the reciprocating manner between the front side and the rear side.

Effect of the Invention

Thus, according to the present invention, the medicine holding member includes the frontward-rearward moving member, which reciprocatingly moves in the forward and rearward directions of the device body, and the clamping member including the pair of clamp pieces that are supported by the frontward-rearward moving member so as to pivot between the vertical and horizontal positions and that are capable of clamping the medicine. Consequently, although the spacing is limited, the medicine dispensing operation can be appropriately performed, regardless of the type of the medicine.

PREFERRED EMBODIMENTS OF THE INVENTION

An embodiment of the present invention will be described in accordance with the accompanying drawings below.

Figure 1:
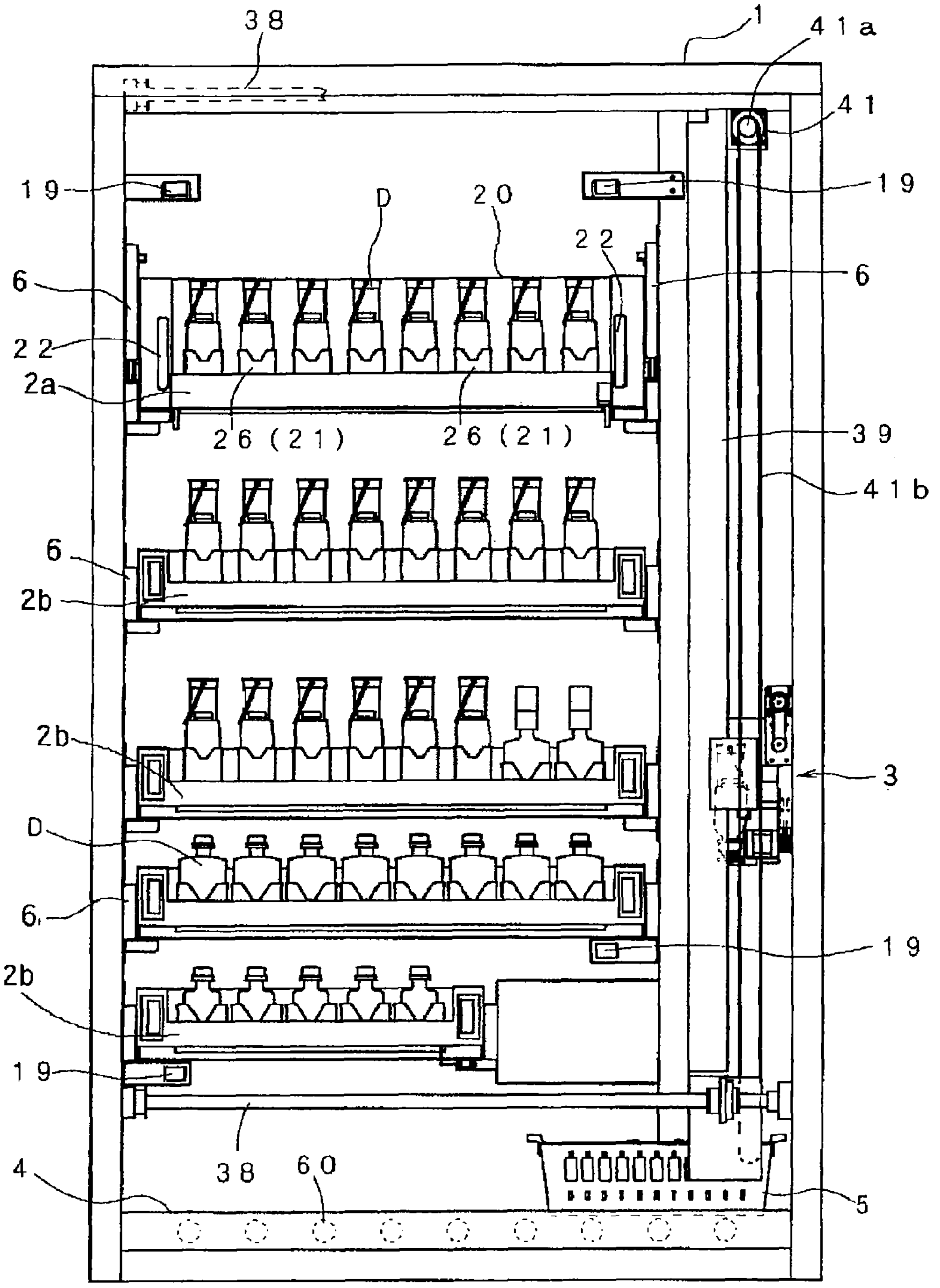
FIG. 1 is a front elevation view of a medicine dispensing device in accordance with the present embodiment.
Figure 2:
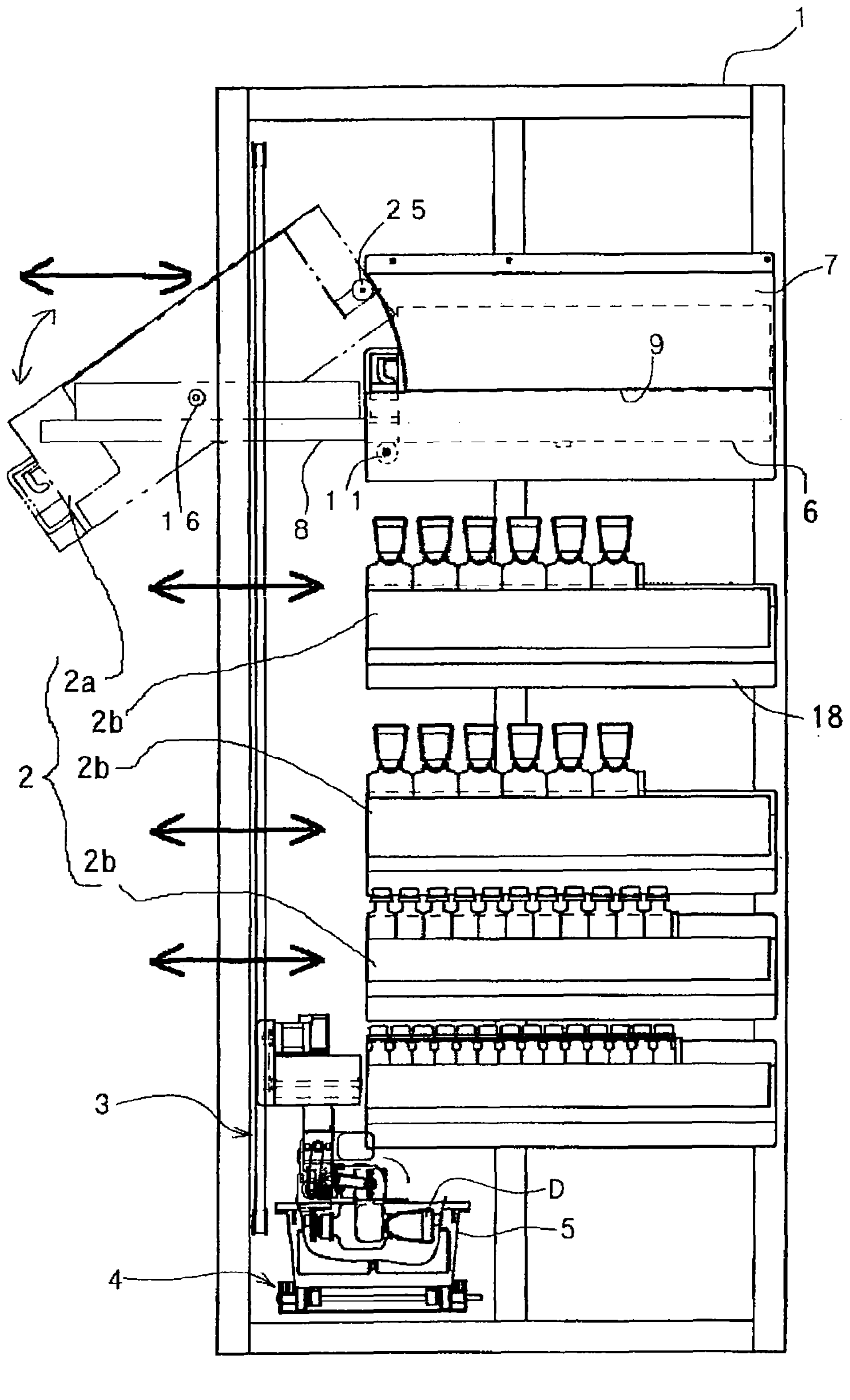
FIG. 2 is a side view of FIG. 1.

FIG. 1 is a front elevation view of a medicine dispensing device in accordance with the present embodiment, and FIG. 2 is a side view thereof. In the medicine dispensing device, a device body 1 has a plurality of shelf members 2 juxtaposed in the upward and downward directions. A medicine D stored in a respective shelf member 2 is stored in a tray 5 by being conveyed to a lower side by using a medicine conveyance member 3 provided on the side of a front face of the device body 1. The tray 5 is mounted on a tray conveyance line 4 and conveyed.

Figure 3:
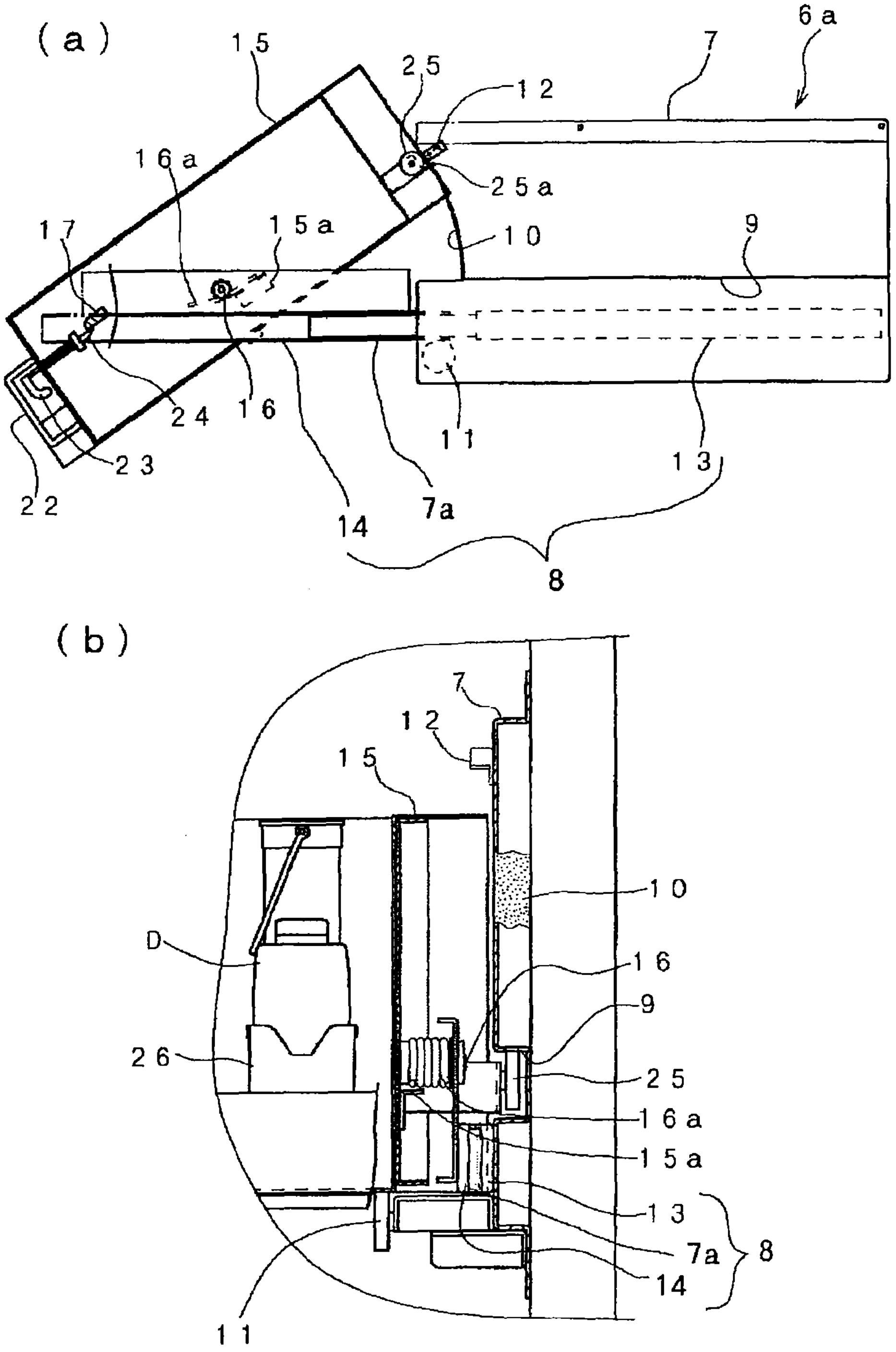
FIG. 3(*a*) is a detail view showing a draw-out structure of a shelf member in FIG. 2, and FIG. 3(*b*) is a locally enlarged side-sectional view thereof.

The device body 1 has a frontside openable and closable by a door (not shown), and has a plurality of guide members 6 provided on sidewall inner surfaces. The guide members 6 have two types of functions and, as shown in FIGS. 2 and 3, include a first guide member 6*a* positioned in an uppermost portion and second guide members 6*b* positioned lower than the first guide member. The first guide member 6*a* tilts about a pivot 16 in the center after the shelf member 2 has been drawn out, however, the second guide members 6*b* do not have the function.

The first guide member 6*a* includes a guide wall 7 and a guide rail 8 slidably supported by an inner surface of the guide wall 7. The shelf member 2 reciprocatingly moves in a forward and rearward directions along an arrow mark shown in FIG. 2.

With reference to FIG. 3(*a*), the guide wall 7 has a first guide surface 9 extending in the forward and rearward directions, which is formed on a lower edge of an upper half, and a circularly arcuate second guide surface 10 formed on a front end face (front side) of the upper half. A support roller 11 is rotatably disposed on a front side of a lower half portion of the guide wall 7. The second guide surface 10 is provided with a stopper 12 that stops further rotation of the shelf member 2 being abutted with a protrusion piece 25*a* provided in the vicinity of a below-described guide roller 25 of the shelf member 2. The guide roller 25 rolls over the first guide surface 9 and the second guide surface 10 formed on the first guide member 6*a* of the device body 1.

In a guide rail 8, an intermediate rail portion 7*a* is slidably provided in a first rail portion 13 integrated with the guide wall 7, and a second rail portion 14 is slidably provided to the intermediate rail portion 7*a*. Thereby, the second rail portion 14 is reciprocatingly movable in the forward and rearward directions of the device body 1. A support wall 15 is formed above the second rail portion 14. A pivot 16 is provided in a central portion of the support wall 15 to thereby rotatably support the shelf member 2, whereby a first shelf member 2*a* is configured, as shown in FIG. 1. A spring 16*a* is provided around the pivot 16. One end portion of the spring is fixedly secured to the support wall 15 and the other end portion is abutted against an abutment receiving portion 15*a* formed in the shelf member 2, whereby the shelf member 2 is urged in the horizontal state. In addition, as shown in FIG. 3(*a*), an anchor receiving section 17 is formed on the front side of the support wall 15, wherein an anchoring portion 24 of a lock member 23 provided on the shelf member 2 is anchored. Thereby, the shelf member 2 is stopped for the rotation, thereby entering a tilted state.

With reference to FIG. 2, a second shelf member 2*b* is supported by the second guide member 6*b*, and has a support rail section 18 slidably supported along the forward and rearward directions of the device body 1. The second guide member 6*b* only supports the second shelf member 2*b* reciprocatingly movable along the forward and rearward directions, such that, different from the first shelf member 2*a*, the second shelf member 2*b* does not tilt.

With reference to FIG. 1, shelf positional shift sensors 19 are respectively provided in upper and lower portions of both sidewalls (in the present embodiment, the sensors are configured of two sets of sensors, each set having an light emitting device and a photoreceptor device). The shelf positional shift sensors 19 detects whether or not the shelf member 2 remains in the drawn-out state. In more specific, the shelf member 2 has through-holes formed in stored states in appropriate positions of the device body 1 to enable light transmission from the light emitting devices to the photoreceptor devices.

As shown in FIG. 1, the shelf member 2 is such that medicine storage portions 21 are formed in a plurality of arrays along the width direction as viewed from the frontside of the device body 1 in a box body 20 whose upper surface is open and front side is cut out. The handle 22 is provided on each of both end portions of the front face of the box body 20.

Figure 4:
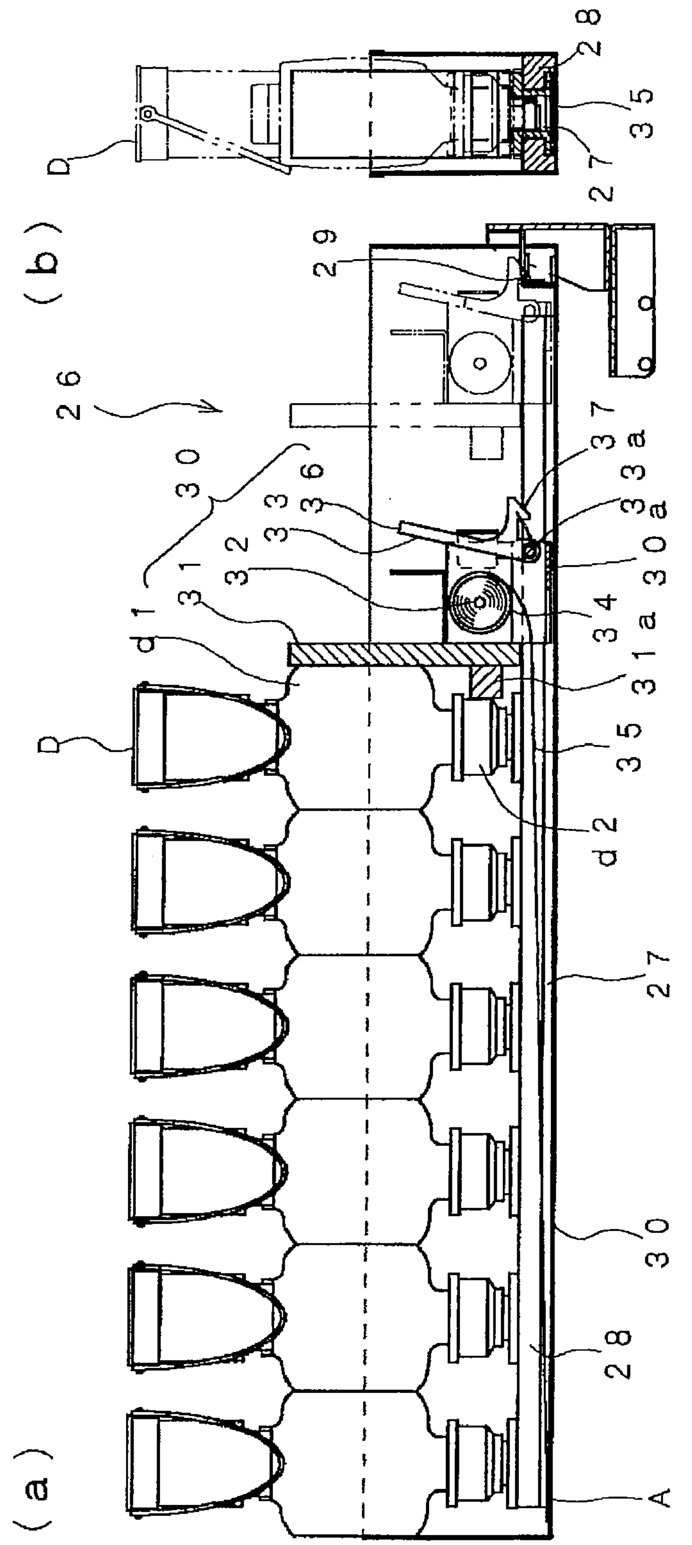
FIG. 4(*a*) is a cross sectional view of cassettes arranged in the shelf member shown in FIG. 3, and FIG. 4(*b*) is a side cross sectional view thereof.

With reference to FIG. 4, the cassette 26 is formed as a box with an open upper plane and so as to be capable of storing, wherein medicines D are aligned in an array with portions on upper sides (upper halves, for example) thereof being exposed. A bottom wall of the cassette 26 has a support plate 28 lengthy to the two sides so that a groove portion 27 is formed along a delivery direction of the stored medicines D. Thereby, an area in contact with the medicines D can be reduced, and a spring portion 35 of a constant load spring 32 can be positioned in the groove portion 27. An anchoring hole 29 where an anchor portion 37 of an anchoring lever 33, described below, is anchored is formed in a rear end portion of the cassette 26. Although the respective cassettes 26 may all be formed in the same size to store medicines D with the same shape in the same box body 20, if the cassettes are different in size (such as, the distance between the sidewalls, and the height of the sidewall), medicines D with other shapes can be stored.

With reference to FIGS. 4(*a*) and 4(*b*), the medicine push out member 30 has a configuration wherein the pusher 31, the constant load spring 32, and the anchoring lever 33 are provided in a casing 30*a*.

The casing 30*a* is disposed on the bottom wall of the cassette 26 to be slidable along the delivery direction.

Figure 10:
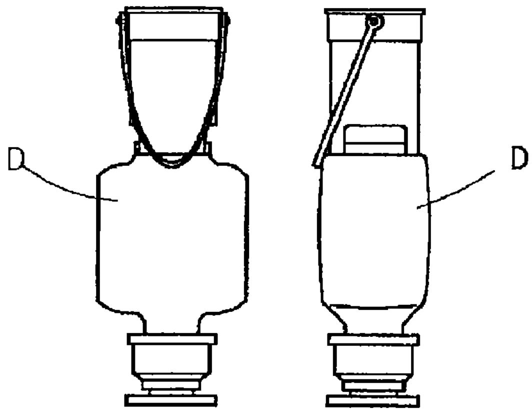
FIG. 10 shows views showing medicines to be stored in cassettes.
Figure 10:
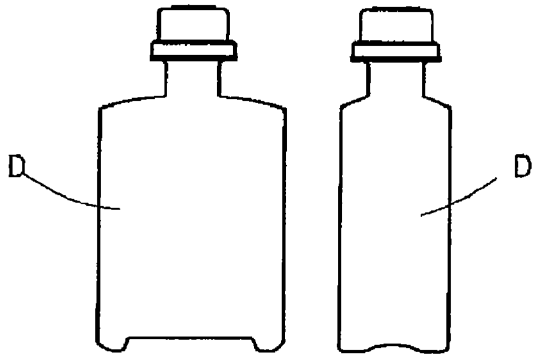
Figure 10:
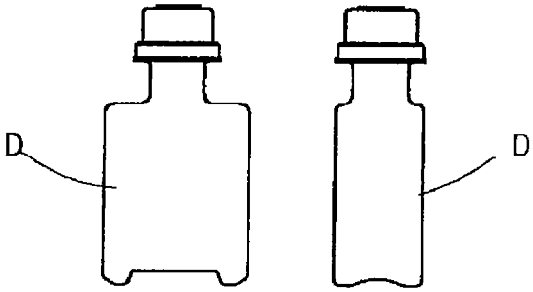

The pusher 31 is fixedly secured to an end face of the casing 30*a* and is formed in the shape of a plate that is capable of pushing the sidewall of the medicine D. In the present case, the pusher is formed in a stepped shape with a protrusion 31*a* provided on an abutment surface to be able to support a body portion d1 and leg portion d2, which is thinner than the body portion d1, of the medicine D with the shape shown in FIGS. 4(*a*) and 10(*a*). As shown in FIGS. 10(*b*) and 10(*c*), various types of medicines D are used. By changing the shape of the pusher 31 corresponding to the shape, the medicine D can be smoothly compressed along the delivery direction.

With reference to FIG. 4(*a*), the constant load spring 32 includes a drum 34 disposed in the casing 30*a*, and the spring portion 35 formed by winding a lengthy strip around the drum 34. In the constant load spring 32, the spring portion 35 extended from the casing 30*a* retracts into the casing 30*a* with a constant load, regardless of the extension size. The spring portion 35 is positioned in the groove portion 27 on the bottom wall of the cassette 26, and a lead end A of the spring portion 35 is fixedly secured on the front end face side of the cassette 26. In the present embodiment, commercially available "Constant"® or the like is used for the constant load spring 32.

The anchoring lever 33 is provided pivotably about a pivot portion 33*a* in the center, of which one end portion forms an operation section 36 for directly operating by a finger, and the other end portion forms the anchoring tab 37 that engages and disengages with the rear end side of the cassette 26.

Figure 5:
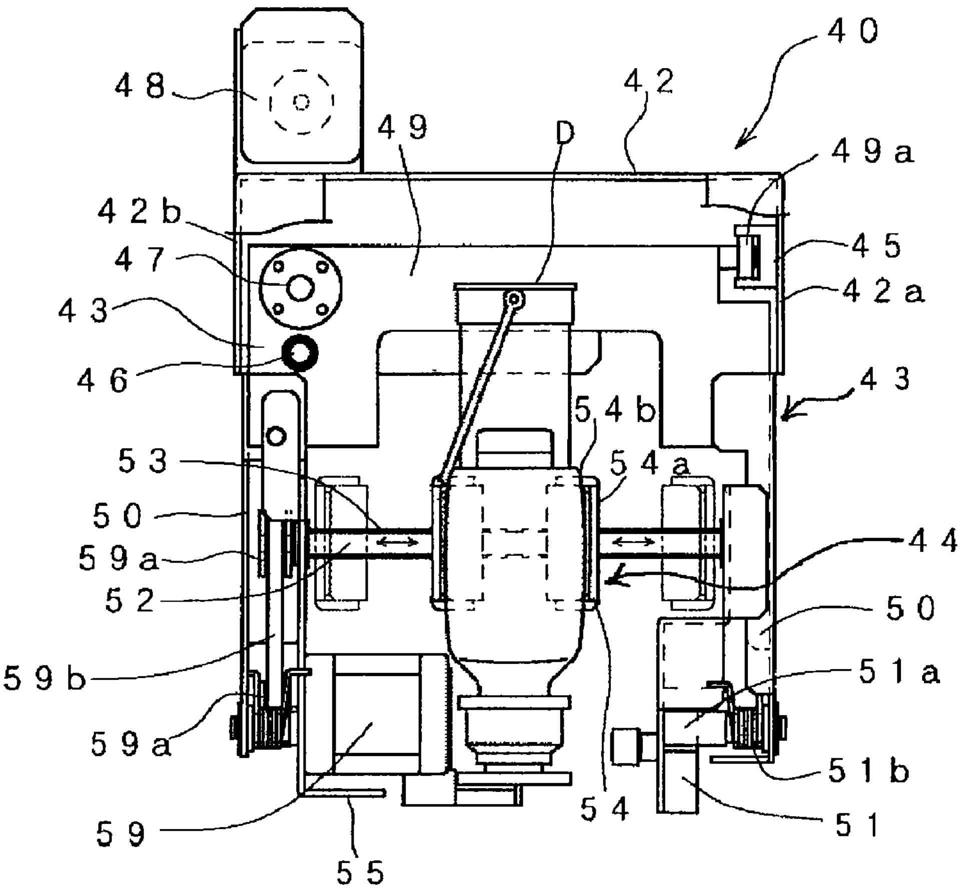
FIG. 5 is a front elevation view of a clamping member shown in FIG. 1.
Figure 6:
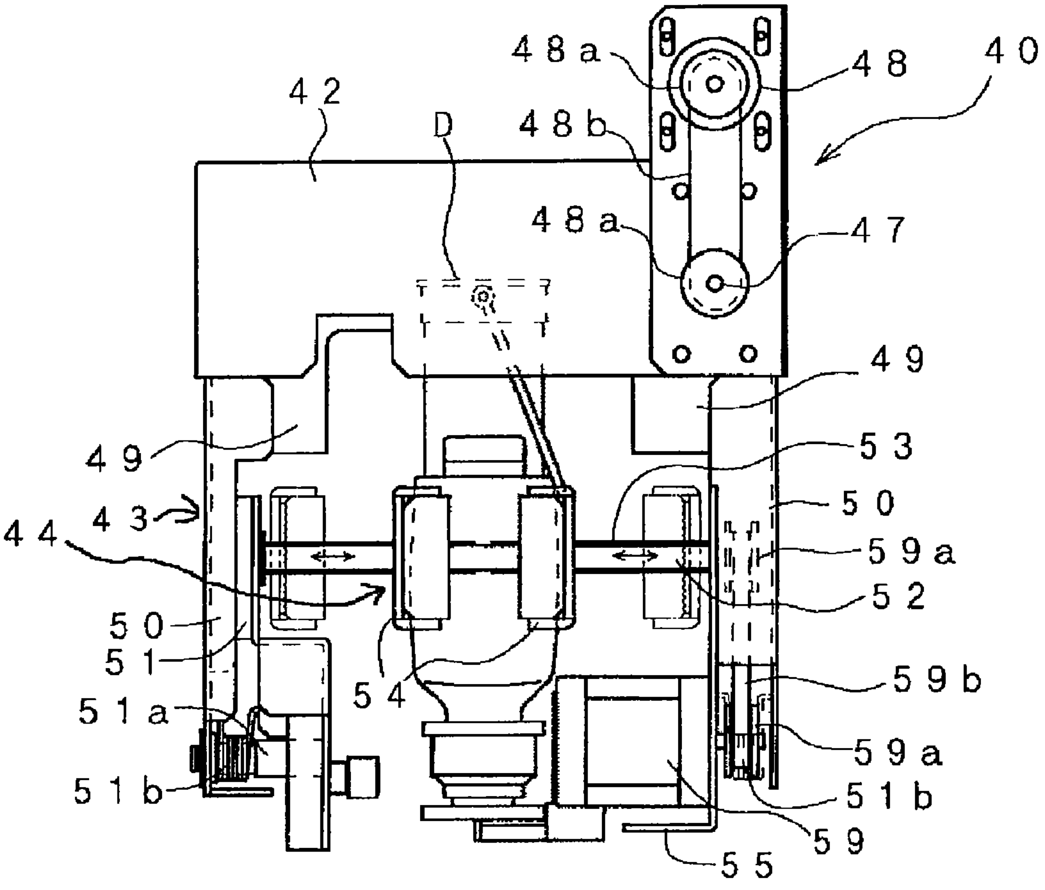
FIG. 6 is a rear side elevation view of FIG. 5.
Figure 7:
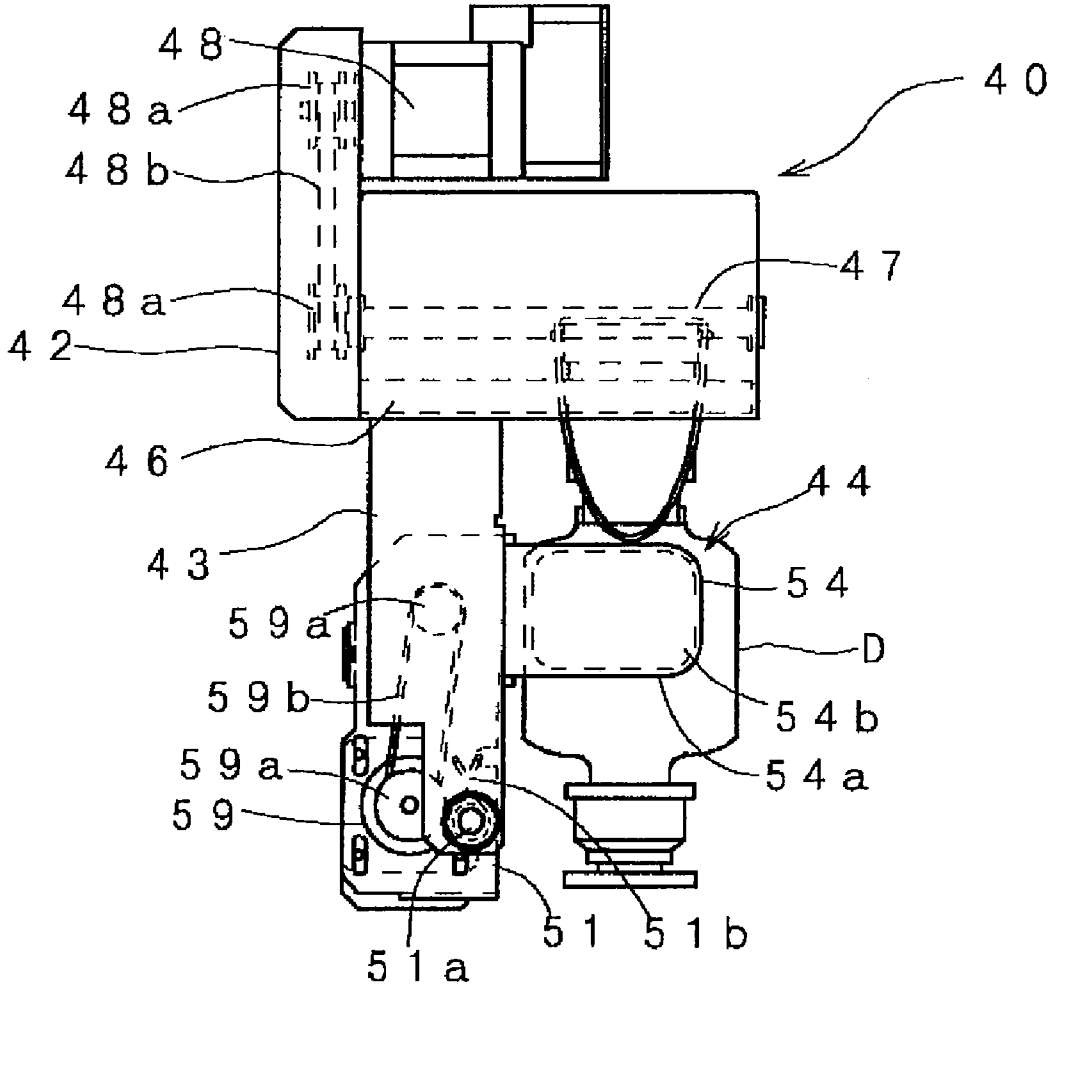
FIG. 7 is a side view of FIG. 5.

As shown in FIG. 1, the medicine conveyance member 3 has horizontal guide bars 38, a vertical guide bar 39, and a medicine holding member 40 shown in FIGS. 5 and 6.

Figure 11:
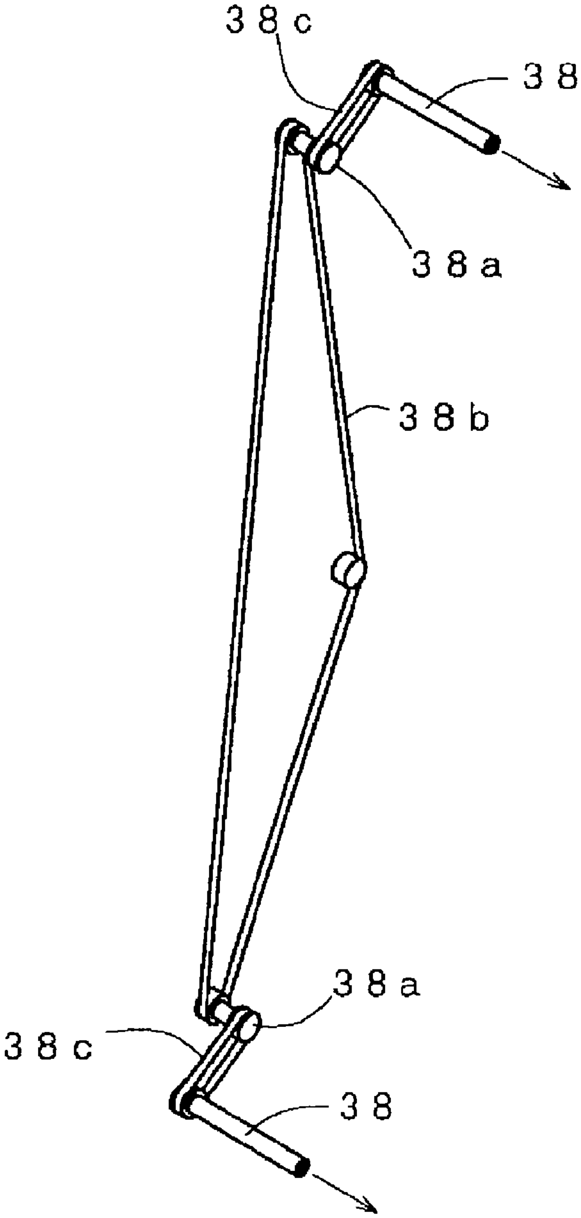
FIG. 11 is an outline view descriptive of an operation state of a horizontal guide bar shown in FIG. 1.

The horizontal guide bars 38, respectively, are disposed on upper and lower portions of the front side of the device body 1, and extends horizontally in the right and left directions as viewed in FIG. 1. The respective horizontal guide bars 38 synchronously rotate via pulleys 38*a* and belts 38*b* and 38*c* shown in FIG. 11. The horizontal guide bars 38 are each composed of a screw thread. The vertical guide bar 39 is such that the horizontal guide bars 38 engage upper and lower end portions thereof. The horizontal guide bars 38 are forwardly and reversely rotated by driving a motor (not shown), thereby reciprocatingly moving the vertical guide bar 39 and the medicine holding member 40. A drive motor 41 shown in FIG. 1 is provided on an upper portion of the vertical guide bar 39, thereby upwardly and downwardly moving the medicine holding member 40 connected to a midway portion of a belt 41*b* via a pulley 41*a* and the belt 41*b*.

With reference to FIGS. 5 to 8, the medicine holding member 40 has a configuration wherein a frontward-rearward moving member 43 is reciprocatingly movably provided on a support member 42, and a clamping member 44 is pivotably provided on the frontward-rearward moving member 43.

The support member 42 has sidewall portions 42*a* and 42*b* whose upper portions connected. A guide receiving portion 45 is provided on an inner face of the one wall, sidewall portion 42*a*, and a first guide shaft 46 and a first screw thread 47 are provided on the other wall, sidewall portion 42*b*. The first screw thread 47 is rotated by driving a first motor 48 via a pulley 48*a* and a belt 48*b*.

The frontward-rearward moving member 43 has side plate portions 50 provided to oppose both sides of a slide table 49. The slide table 49 is provided with a roller 49*a* rolling on the guide receiving portion 45 of the support member 42. In addition, the slide table 49 is penetrated by the first guide shaft 46, and is engaged with the first screw thread 47. When the first motor 48 is driven and forwardly and reversely rotated to rotate the first screw thread 47, the engagement position on the slide table 49 is varied. Thereby, the slide table 49, that is, the frontward-rearward moving member 43 reciprocatingly moves along the first guide shaft 46.

The clamping member 44 has a pair of pivotal plates 51, a second guide shaft 52 and a second screw thread 53 provided between the pivotal plates 51, and a pair of clamp pieces 54 penetrated by the second guide shaft 52 and engaging the second screw thread 53. The pivotal plates 51 are each mounted rotatably about a rotation shaft 51*a* in the center, the rotation shaft 51*a* being provided on the side plate portion 50 of the frontward-rearward moving member 43. Springs 51*b* are disposed on both end sides of the rotation shaft 51*a*, and the pivotal plate 51 is urged so as to be situated in the vertical position shown in FIG. 7.

A pressure receptor portion 55 is provided to extend in the horizontal direction in a lower end portion of the one pivotal plate 51. As described below, when the medicine conveyance member 3 is moved to a dispensing position, the pressure receptor portion 55 is compressed by a compressing piece (which corresponds to a compressing section according to the present invention, although not shown) provided in the device body 1. This causes the pivotal plate 51, that is, the clamping member 44, to rotate, thereby enabling a horizontally position of the medicine D clamped by the clamp pieces 54.

Figure 9:
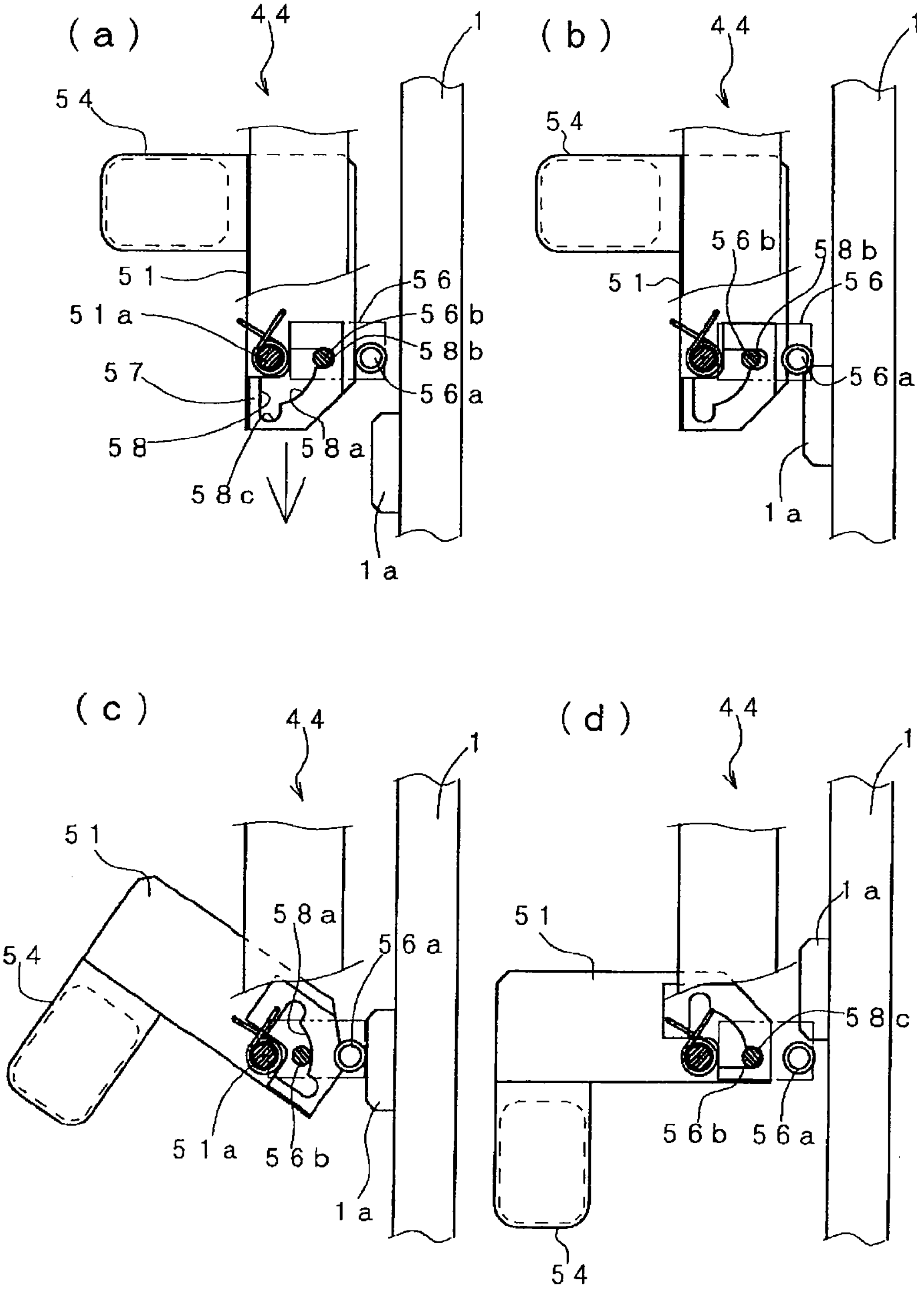
FIG. 9 shows views depicting a pivoted state of the turn plate.

In addition, as shown in FIG. 9, in a lower end portion of the other pivotal plate 51, a first lock plate 56 is provided so as to be reciprocatingly movable in the state urged by a spring (not shown) in the horizontal direction (right side in FIG. 9(*b*)). A roller 56*a* and a lock pin 56*b* are provided on the first lock plate 56. The roller 56*a* is compressed by a projected portion 1*a* formed in the device body 1, thereby reciprocatingly moving in the horizontal direction along the projected portion 1*a*. The lock pin 56*b* moves in a lock hole 58 in a second lock plate 57 integrated with a lower end portion of the pivotal plate 51. The lock hole 58 is formed in a shape of a fan or sector with an arcuate portion 58*a* having a first lock recessed portion 58*b* and a second lock recessed portion 58*c* formed at the end portions thereof. When the clamping member 44 moves downward, the roller 56*a* is compressed by the projected portion 1*a* to thereby reciprocatingly move against urging forces of the spring 51*b*. Thereby, the lock pin 56*b* falls off from the first lock recessed portion 58*b*, moves to the second lock recessed portion 58*c* via the arcuate portion 58*a*, and then engages therewith. On the other hand, when the clamping member 44 moves upward, the roller 56*a* is compressed by the projected portion 1*a* to thereby reciprocatingly move against urging forces of the spring 51*b*. Thereby, the lock pin 56*b* falls off from the second lock recessed portion 58*c*, and moves to the first lock recessed portion 58*b* via the arcuate portion 58*a*.

Figure 8:
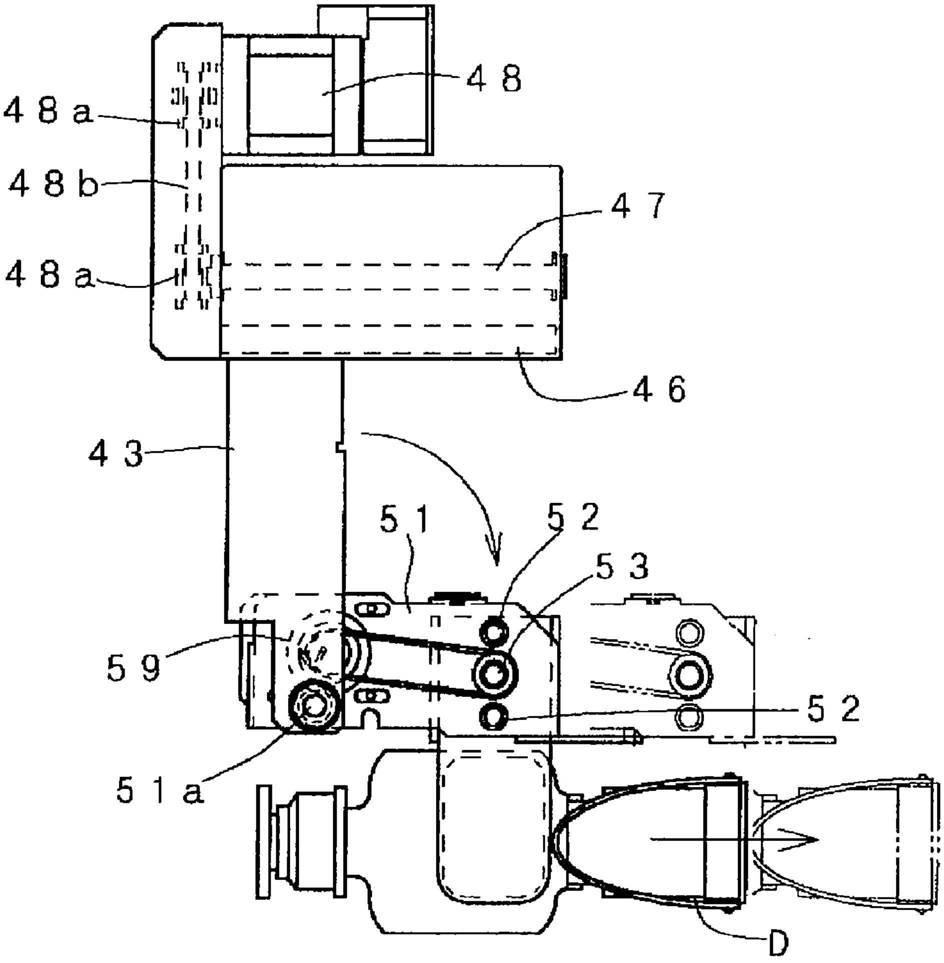
FIG. 8 is a view showing a state where a turn plate pivoted from the state of FIG. 7.

As shown in FIG. 8, two second guide shafts 52 as shown in FIGS. 5 and 6 are disposed on two sides with the second screw thread 53 in the center. The second screw thread 53 is mounted with the pair of clamp pieces 54 engaged therewith and further axially received by two second guide shafts 52. In addition, the second screw thread 53 is formed such that threads are formed in the mutually opposite relationship with respect to substantially the center of the axial length (for example, right-hand threads in the left half, and left-hand threads in the right half). Thereby, when the second screw thread 53 is rotated, the engagement position of the respective clamp piece 54 varies, such that the clamp pieces 54 move close to or away from one another along respective two second guide shafts 52. The second screw thread 53 is forwardly and reversely rotated via a pulley 59*a* and a belt 59*b* in accordance with the forward and reverse rotation of a second motor 59.

Referring to FIG. 5, the clamp piece 54 is configured of an outer frame 54*a* that guides to be a rectangular shape in a side view, and a resilient guide portion 54*b* that press-contacts the outer peripheral surface of the medicine D. The resilient guide portion is formed in such a manner as to form a cross sectional surface along a plane in contact with the medicine D into a sawtooth shape, thereby stabilizing the retained state of the medicine D.

Referring to FIG. 1, the tray conveyance line 4 is configured of a plurality of conveyance rollers 60 arranged in the horizontal direction at a predetermined pitch. The conveyance rollers 60 are rotated by a motor or the like (not shown) to convey the tray 5 placed thereover. A stopper (not shown) is provided on one end side of the tray conveyance line 4, whereby the conveyed tray 5 is temporarily stopped at the dispensing position to thereby make it possible to dispense the medicine D conveyed by the medicine conveyance member 3.

Figure 12:
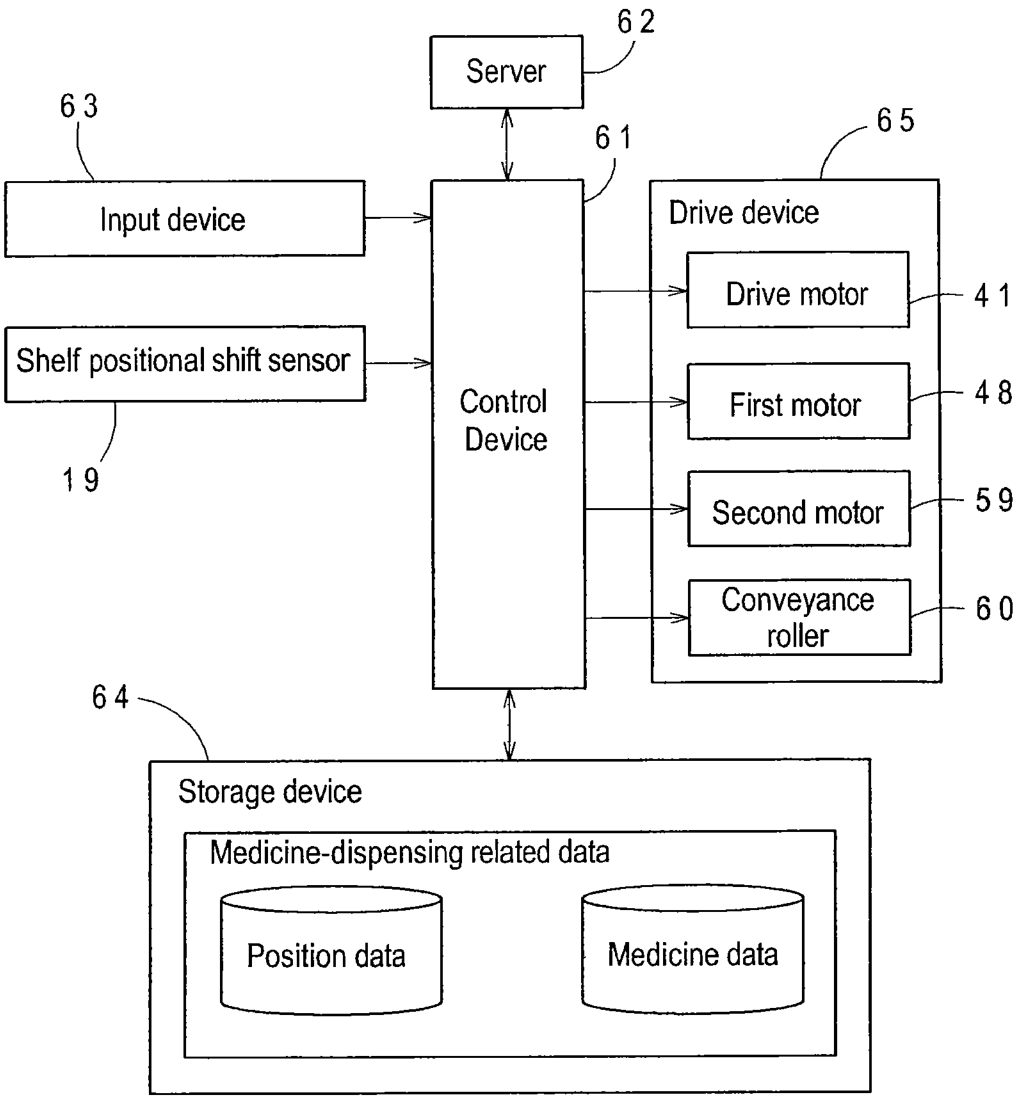
FIG. 12 is a block diagram of a medicine supply unit in accordance with the present embodiment.

Referring to a block diagram of FIG. 12, in the medicine dispensing device configured as described above, a control device 61 refers to data stored in a storage device 64 and thereby performs drive control of respective driving devices 65. The control is performed in accordance with, for example, prescription data input from, for example, a server 62 and an input device 63, and a detection signal in the shelf positional shift sensor 19. The storage device 64 contains, for example, position data on the positions of the cassettes 26 in the shelf members 2, and various medicine-dispensing related data including types of medicines D stored in the respective shelf members 2, residual amounts thereof, and shapes thereof, for example.

Figure 13:
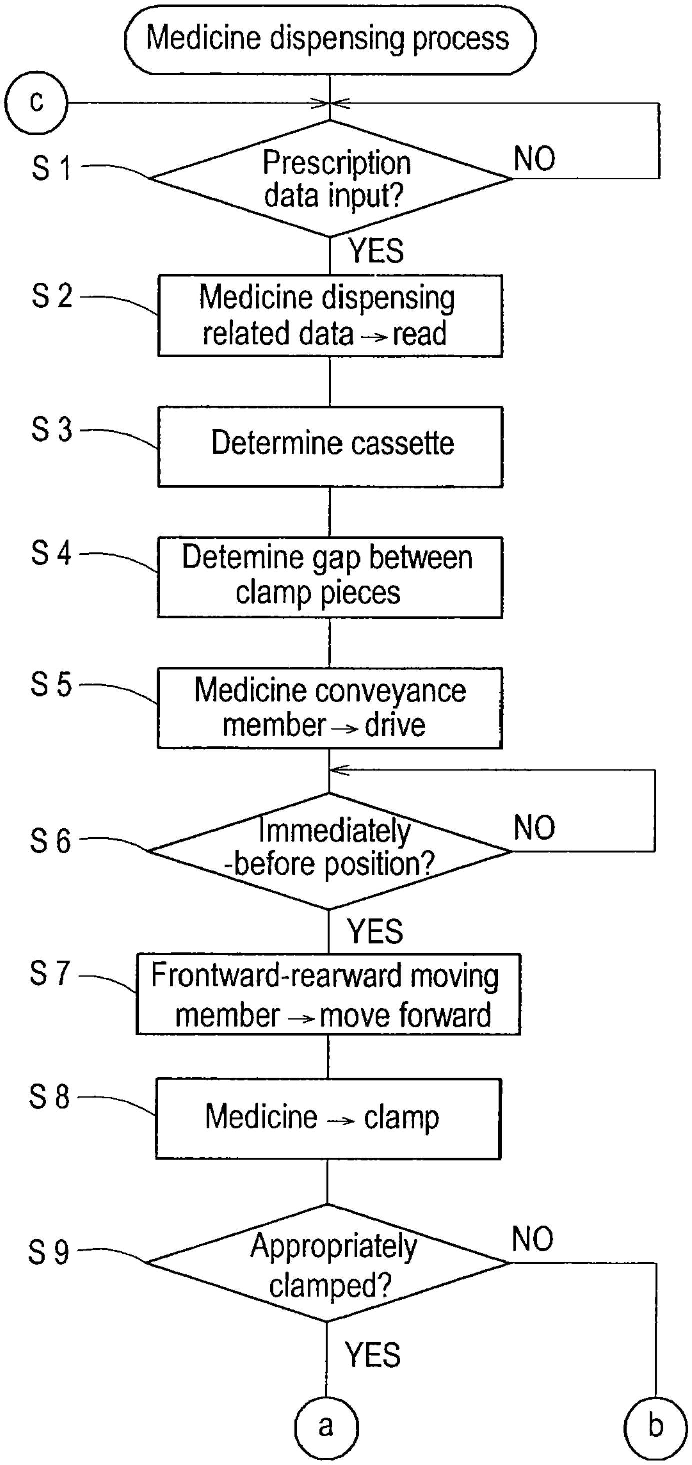
FIG. 13 is a flowchart diagram showing operation of the medicine dispensing device in accordance with the present embodiment.
Figure 14:
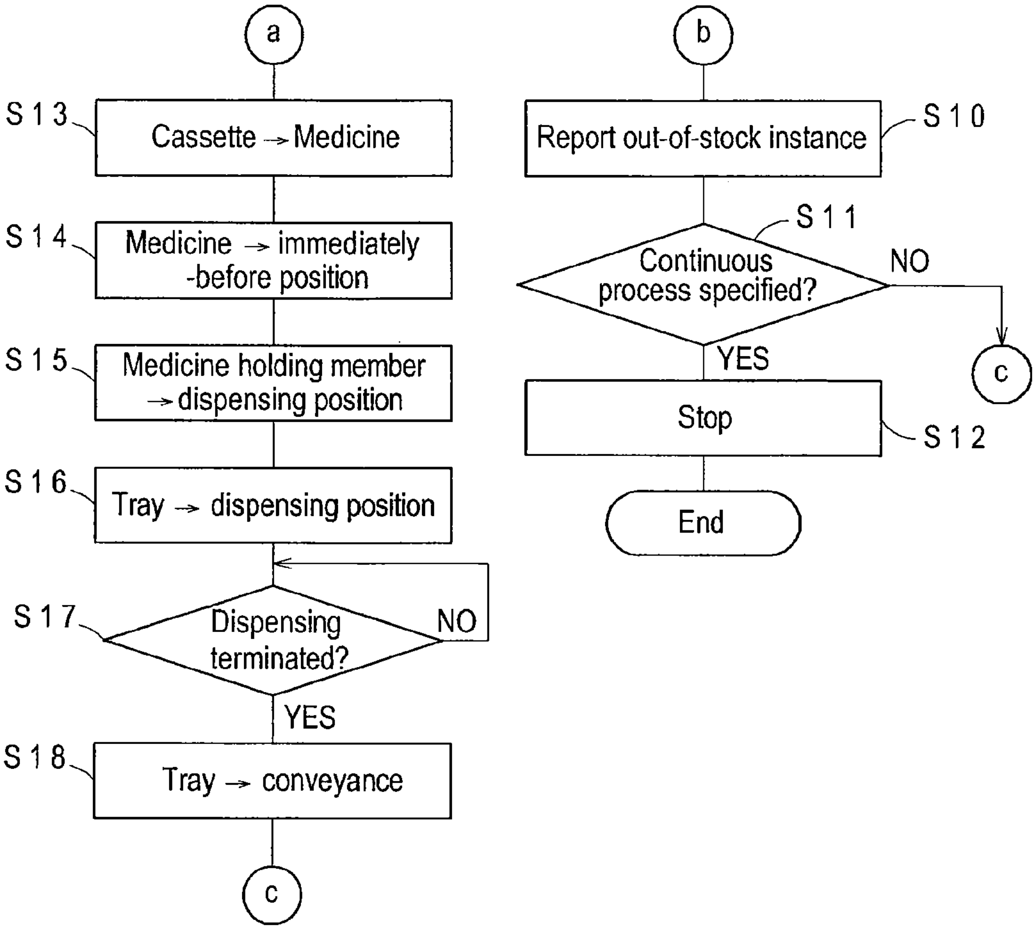
FIG. 14 is a flowchart diagram showing the operation of the medicine dispensing device in accordance with the present embodiment.

Operation of the medicine dispensing device configured as described above will now be described in accordance with flowchart diagrams shown in FIGS. 13 and 14.

When prescription data is input from, for example, the server 62 or the input device 63 (step S1), the device reads out medicine-dispensing related data (step S2), which is stored in the storage device 64, in accordance with the input prescription data. Then, in accordance with the read-out medicine-dispensing related data, the device determines a cassette 26 on a shelf member 2 from which a medicine D described in the prescription data is taken or removed (step S3). In addition, in accordance with the shape of the medicine D contained in the medicine-dispensing related data, the gap between the clamp pieces 54 is predetermined to be slightly larger than the width of the medicine D (step S4). Thereby, the medicine D can be clamped with a minimum operation in the state of the medicine holding member 40 moved to an immediately-before position of the medicine D, and hence the operation time therefor can be reduced. Further, since the gap between the clamp pieces 54 relative to the width of the medicine D can be minimized, the cassette 26 in the respective shelf member 2 can be arranged close to a position not interfering with the clamp pieces 54.

Subsequently, the medicine conveyance member 3 is driven, thereby moving the medicine holding member 40 to the shelf member 2 storing the corresponding medicine D (step S5). When the medicine holding member 40 is moved to the immediately-before position of the shelf member 2 storing the corresponding medicine D (step S6), then the first motor 48 is forwardly driven to forwardly move the forward-rearward moving member 43 (step S7). Then, the second motor 59 is driven, and the medicine D is clamped by the clamp pieces 54 (step S8).

Then it is determined whether or not the medicine D is appropriately clamped by the clamp pieces 54 (step S9). The determination is made to detect the energized state of current to the second motor 59 for fining whether or not the state is in an overcurrent state. If in the overcurrent state wherein, for example, a detected voltage value in excess of a predetermined threshold value, then it is determined that the medicine D is clamped by the clamp pieces 54. Alternatively, if the detected voltage value is not in excess of the threshold value, then it is determined that nothing is clamped by the clamp pieces 54.

If it is determined that the medicine D is not appropriately clamped by the clamp pieces 54, then it is recognized that the medicine D is not stored in the corresponding cassette 26 and it is reported as an out-of-stock instance (step S10).

Then it is determined whether or not a continuous process is set (step S11). If the continuous process is not set, then the operation terminates (step S12); or if set, the operation returns to step S1 and iterates the processes.

If it is determined that the medicine D is appropriately clamped by the clamp pieces 54, then the drive motor 41 of the medicine conveyance member 3 is forwardly driven to thereby move up the medicine holding member 40, and the medicine D clamped by the clamp pieces 54 is pulled out from the cassette 26 (step S13). Then the first motor 48 is reversely driven, and the medicine holding member 40 is returned to the immediately-before position of the cassette 26 (step S14). In this event, in the cassette 26, the medicines D are compressed by the pusher 31 urged by the constant load spring 32 and are thereby moved forward. As such, the medicines D abut a front-end inner face of the cassette 26, thereby automatically setting preparation for the subsequent dispensing operation.

Subsequently, the medicine holding member 40 is moved to the dispensing position of the tray conveyance line 4 (step S15). In this event, the tray 5 is conveyed by the tray conveyance line 4 to be brought into a standby state at the dispensing position (step S16).

In the medicine holding member 40, the pivotal plate 51 pivots when the compressing piece abuts the pressure receptor portion 55 immediately before the dispensing position is reached. The pivoting position of the pivotal plate 51 is located on the lower side of the lowest shelf member 2, which is located in the lowest position. Accordingly, the medicine D clamped by the clamp pieces 54 is horizontally positioned and forwardly pushed out. Consequently, the size in the forward and rearward directions of a spacing formed on the front side of the shelf member 2 in the device body 1 is reduced, and in addition, the medicine D can be horizontally stored in the tray 5.

After similar processes, when the operation of dispensing the medicine(s) D contained in the prescription data to the tray 5 is completed (step S17), then the stopped state of the tray 5 by the stopper at the dispensing position of the tray conveyance line 4 is reset. Then, the tray 5 is conveyed to the outside from the device body 1 (step S18).

Thus, according to the medicine dispensing device of the present embodiment, the disposition position of the medicine conveyance member 3 and the position for replenishing the medicine D into the cassette 26 by drawing out the shelf member 2 can be located on the front side of the device body 1. Accordingly, the same spacing can be shared, and hence the device itself can be formed to be compact. In addition, the clamp pieces 54 are pivoted on the lower side of the lowest shelf member 2 to thereby enable a clamped medicine D to be dispensed by using the medicine conveyance member 3. Accordingly, the spacing to be formed between the shelf member 2 and the front face of the device body 1 can be reduced. Further, the shelf member 2 can be drawn out in an oblique lower direction, such that even in the case of the first shelf member 2*a*, which is located in the highest position, replenishment of medicines D into the cassette 26 can easily be performed.

When no medicine D remains in a shelf member 2, the medicines D may be replenished by drawing out the shelf member 2. More specifically, the lock member 23 is pulled to thereby disengage the anchoring portion 24 from the anchor receiving section 17 of the device body 1, and the shelf member 2 is pulled out by holding the handles 22. In this case, as shown in FIG. 2 or 3, when the shelf is the highest shelf member 2, the draw-out side at the lead end can be tilted after the shelf member 2 has been drawn out from the device body 1. More specifically, when the shelf member 2 is pulled out by holding the handles 22, the first rail portion 13 and the second rail portion 14 sequentially extents from the sidewall, and the guide roller 25 slides on the first guide surface 9, whereby the shelf member 2 horizontally moves to the front side. When the guide roller 25 reaches the second guide surface 10, the guide function of the first guide surface 9 is lost, so that the shelf member 2 can be rotated about the pivot 16 in the center. As such, when the shelf member 2 is rotated against the urging forces of the spring 16*a*, the guide roller 25 rolls along the second guide surface 10, the draw-out side (lead end side) is tilted in the oblique lower direction. With the shelf member 2 having thus been tilted to the predetermined position, the rotation thereof is stopped by the lock member 23, such that medicines D are replenished into the cassette 26.

When storing the medicines D into the cassette 26, the pusher 31 of the medicine push out member 30 is compressed and moved against the urging forces of the constant load spring 32. Concurrently, the anchoring tab 37 of the anchoring lever 33 is anchored in the anchoring hole 29 formed on the back surface side of the cassette 26. Upon completion of replenishment of medicines D into the cassette 26, the anchoring lever 33 is manipulated to disengage the anchoring tab 37 from the anchoring hole 29. Thereby, the medicines D are moved by the urging forces of the constant load spring 32 to the front side of the cassette 26 to be aligned.

Figure 15:
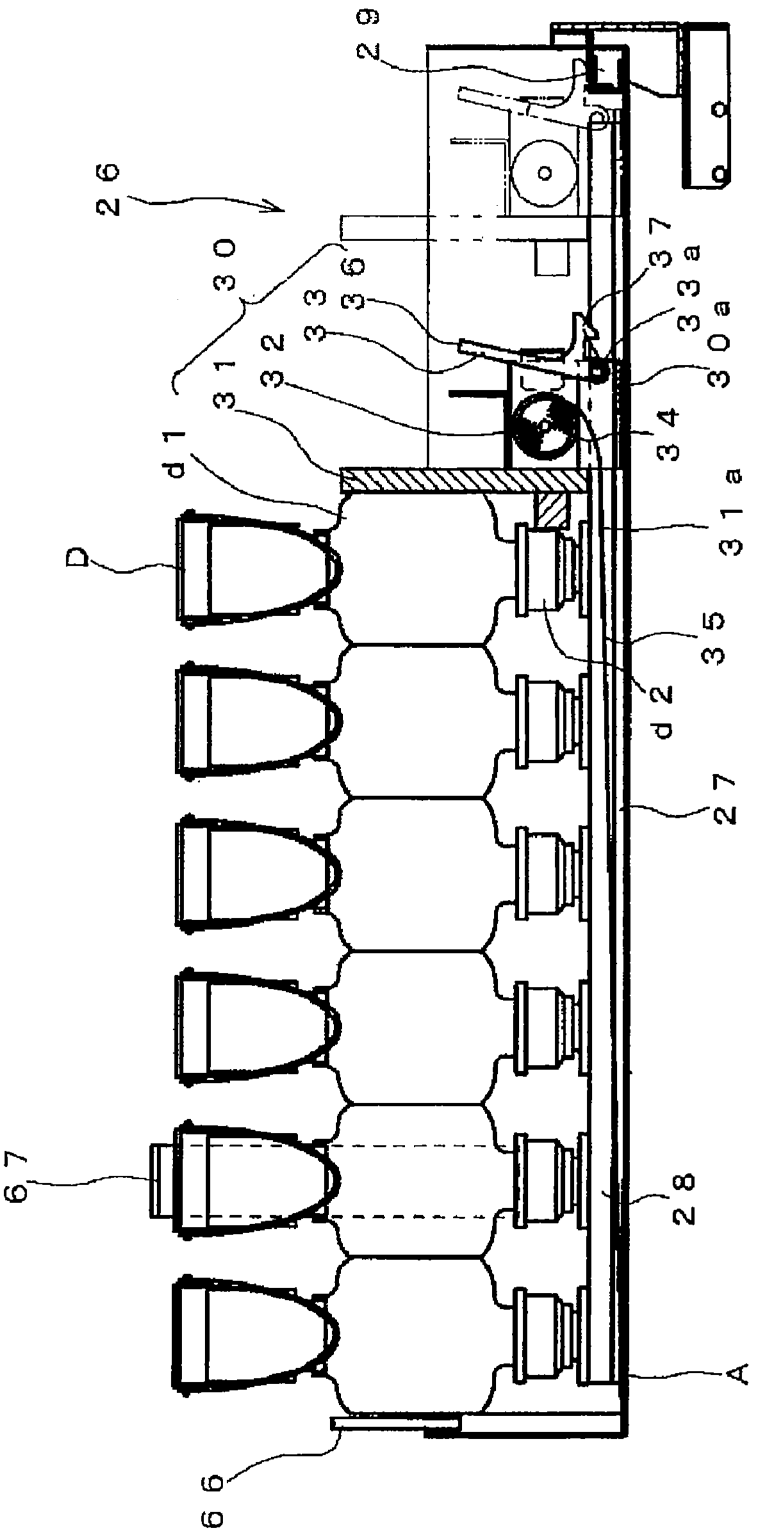
FIG. 15 is a side cross sectional view showing a cassette in accordance with another embodiment.
Figure 16:
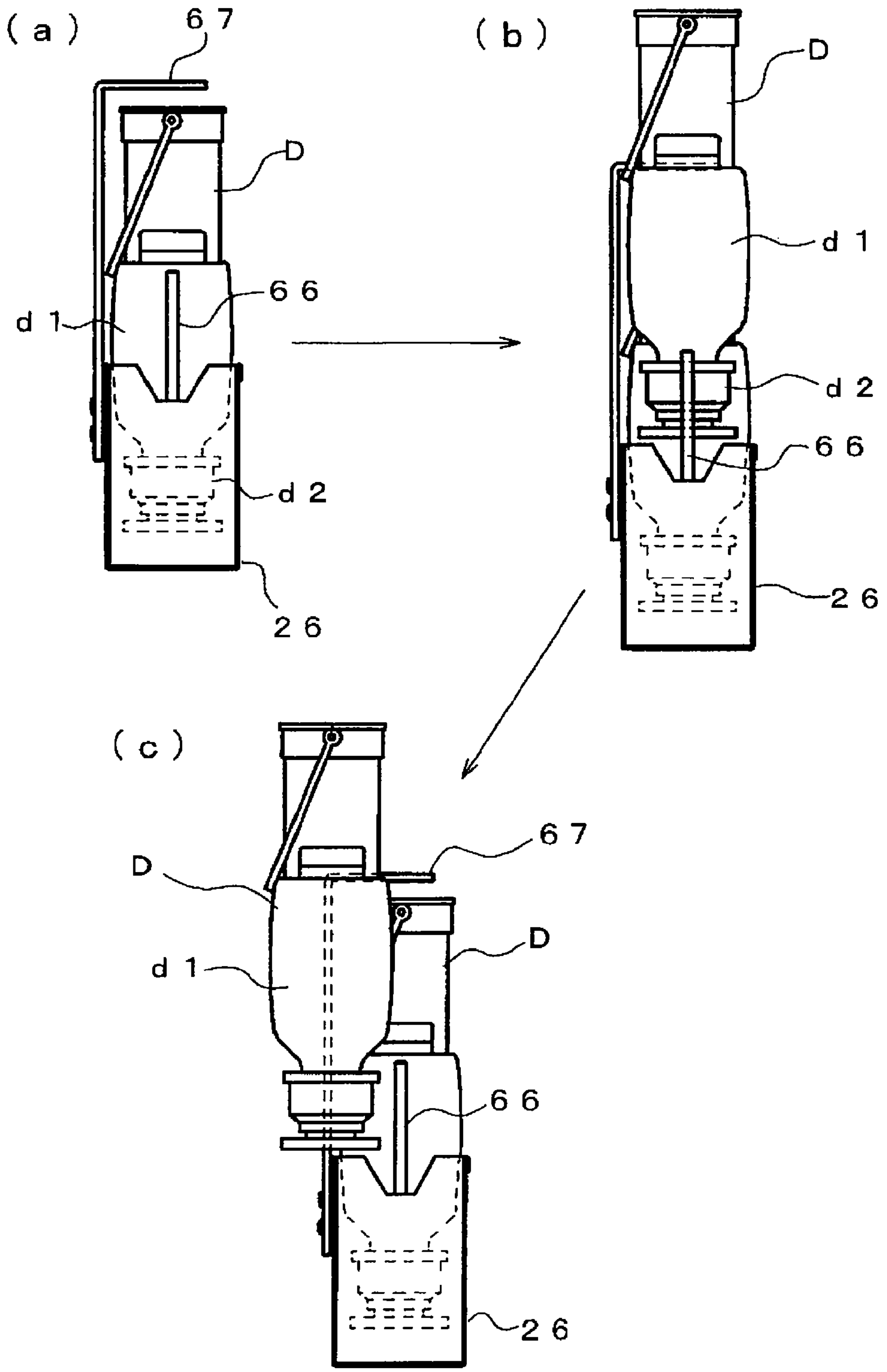
FIG. 16 shows views descriptive of the operation of taking or removing a medicine from the cassette shown in FIG. 15.

FIGS. 15 and 16 show a configuration wherein a fall prevention rod 66 is provided in an end portion on a medicine removal side of the cassette 26. The fall prevention rod 66 is disposed in the center of a substantially V-shaped cutout portion formed in the end portion of the cassette 26, and prevents a fallen state of the specially shaped medicine D. More specifically, the medicine D is such that intravenous-drip injection medication is stored in a specially shaped bottle that has projected portions respectively on the upper and lower portions of the body portion d1 and that additionally has on the lower side the leg portion d2 thinner than the body portion d1. As such, the medicines are arranged unstable in the cassette 26, so that the medicines each tend to fall when being, in particular, removed from the cassette 26. For this reason, the fall prevention rod 66 is provided to enable the support of the body portion d1 of the medicine D up to the vicinity of the upper end thereof, thereby stabilizing the stored state and removal state of the medicine D.

In addition, a guide plate 67 is formed on the cassette 26. The guide plate 67 is vertically formed from a sidewall on the one side of the cassette 26, has a bent shape to become substantially parallel to the cassette bottom wall in the upper position of the medicine D, and has an upper surface portion positioned in the vicinity of the next medicine D. Thereby, in the event of removing the medicine D, even when an adjacent medicine D is induced to be moved together by friction, the medicine D abuts the upper surface portion of the guide plate 67, such that discharging thereof is appropriately prevented.

Figure 24:
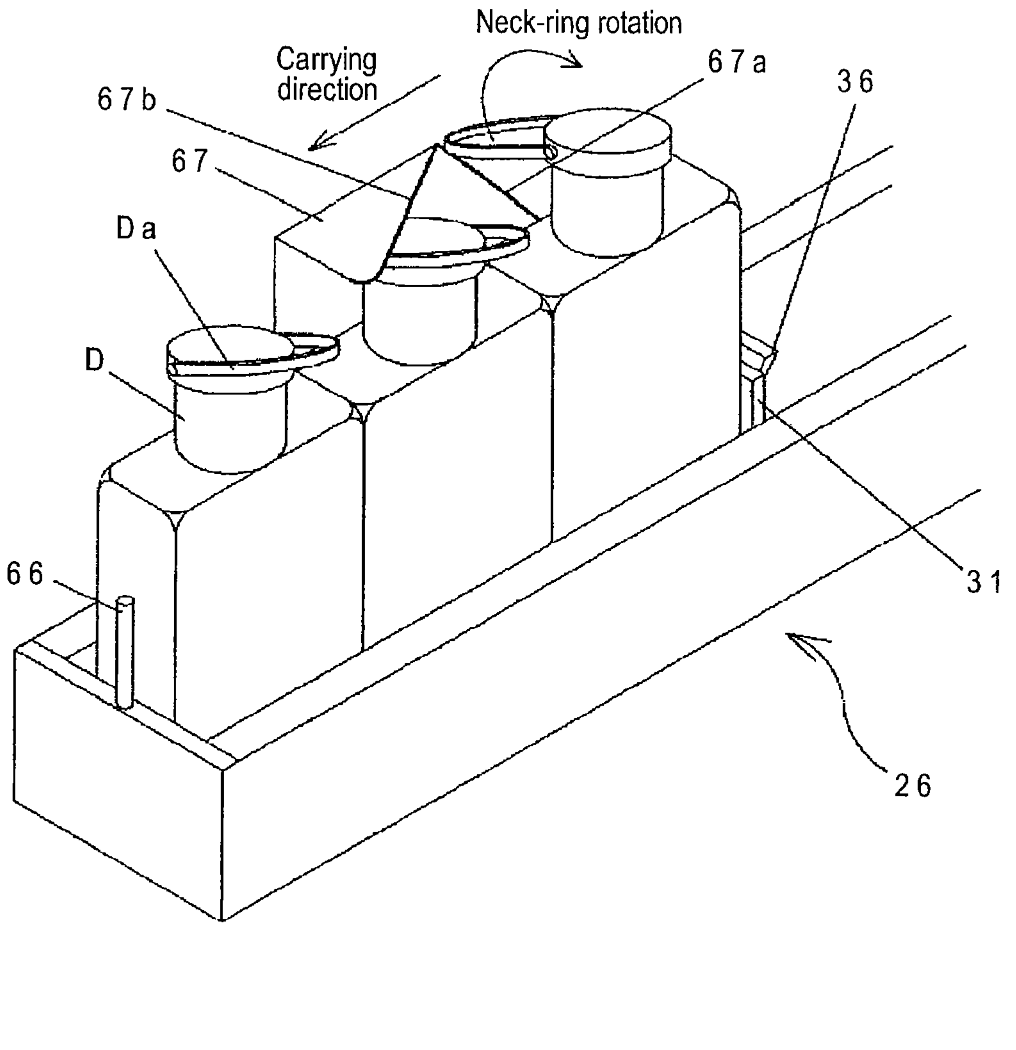
FIG. 24 is a perspective view showing an application example of a guide plate shown with the cassette shown in FIG. 15.

FIG. 24 is a perspective view showing an application example of the guide plate 67 in the cassette shown in FIG. 15. In the case that the medicines D each having the shape shown in the drawing are stored in the cassette 26 and the guide plate 67 shown in FIG. 15 is mounted, when a neck ring Da provided to the medicine D is directed to the side of the guide plate 67 in the course of conveyance with the medicine push out member 30, the guide plate 67 in the cassette shown in FIG. 15 is entangled with a neck ring Da, such that the medicine push out member 30 cannot compress the medicines D. On the other hand, the guide plate 67 shown with the application example has a first sloped surface 67*a* upwardly sloped along the carrying direction, and a second sloped surface 67*b* sloped toward a central position of the cassette 26 from a mounted position of the guide plate 67. When the neck ring Da is directed to the side of the guide plate 67, it abuts the first sloped surface 67*a*, and upwardly rotates in the course of movement along the carrying direction. When the neck ring Da reaches an upper end portion of the guide plate 67, the abutment surface of the neck ring Da changes to the second sloped surface 67*b*, the neck ring Da directed to the side of the guide plate 67 rotates in the opposite direction. As such, in the case of the guide plate 67 in the present application example, when the medicines D are stored into the cassette 26, no care needs to be paid to prevent the neck ring Da from being directed to the side of the guide plate 67. Further, regardless of the direction of the neck ring Da, the medicine D can be securely conveyed by the medicine push-out member 30.

The medicine D is removed in the following manner from the cassette 26 having the fall prevention rod 66. The medicine D is clamped by the clamp pieces 54 of the clamping member 44, and as shown in FIG. 16(*b*), it is moved up to a position higher than the sidewall of the cassette 26. In this event, a next medicine D is prevented by the guide plate 67 from being discharged. Subsequently, the entirety of the medicine holding member 40, which has the clamping member 44, is moved along the horizontal guide bar 38. Then, as shown in FIG. 16(*c*), after the leg portion d2 of the medicine D is moved to a position not interfering with the fall prevention rod 66, the first motor 48 is reversely driven to return the medicine holding member 40 to the immediately-before position of the cassette 26. Thus, the medicine D is clamped by the clamp pieces 54 and removed from the side of the immediately-before position of the cassette 26. However, only the fall prevention rod 66 is additionally provided to the cassette 26, and the clamped medicine D is removed by being shifted to the left or right, such that no case occurs wherein the medicine D interferes with the fall prevention rod 66. Further, the process can be implemented at low costs without increasing the amount of removal time.

Figure 17:
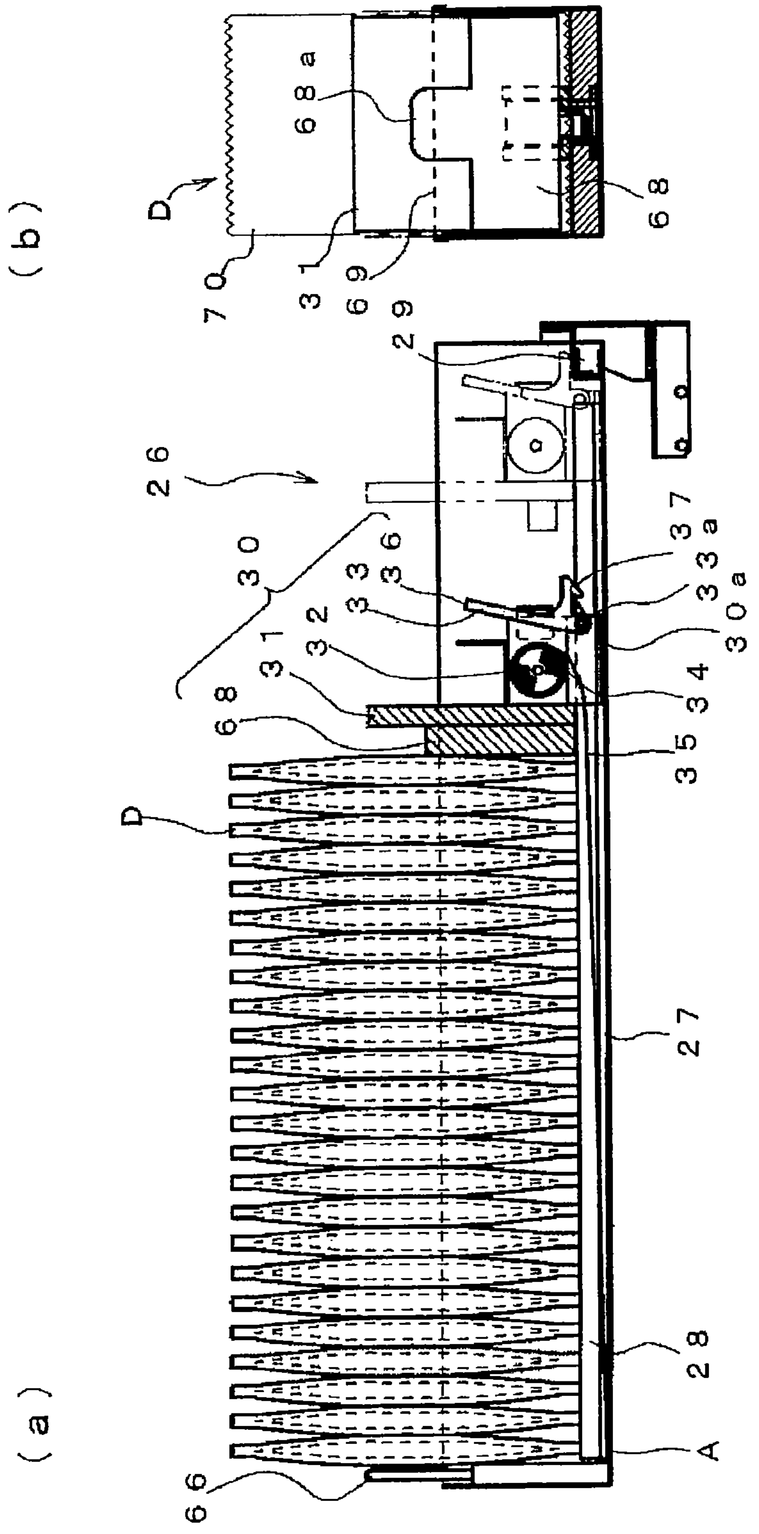
FIG. 17 shows side cross sectional views showing a cassette in accordance with another embodiment.
Figure 18:
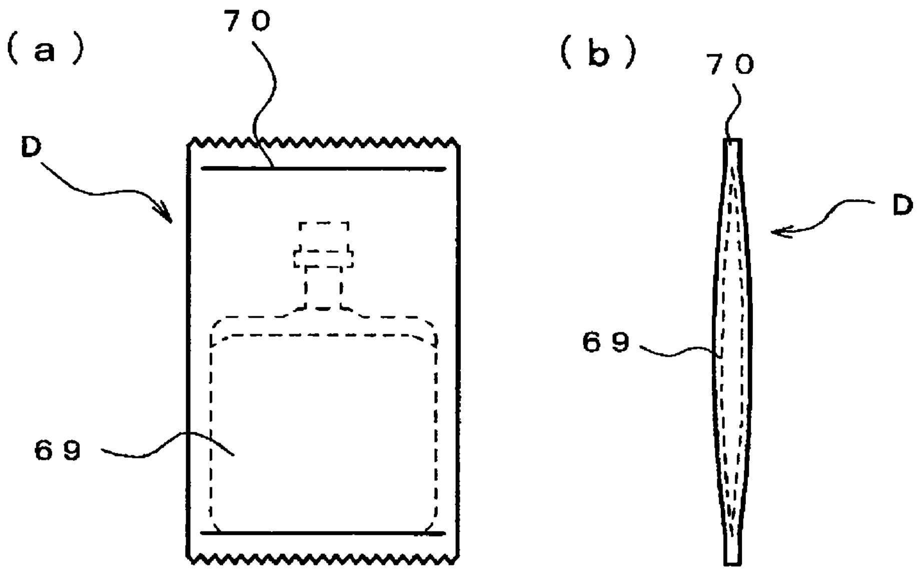
FIG. 18(*a*) is a front elevation view showing medicines to be stored in the cassette shown in FIG. 17, and FIG. 18(*b*) is a side view thereof.
Figure 19:
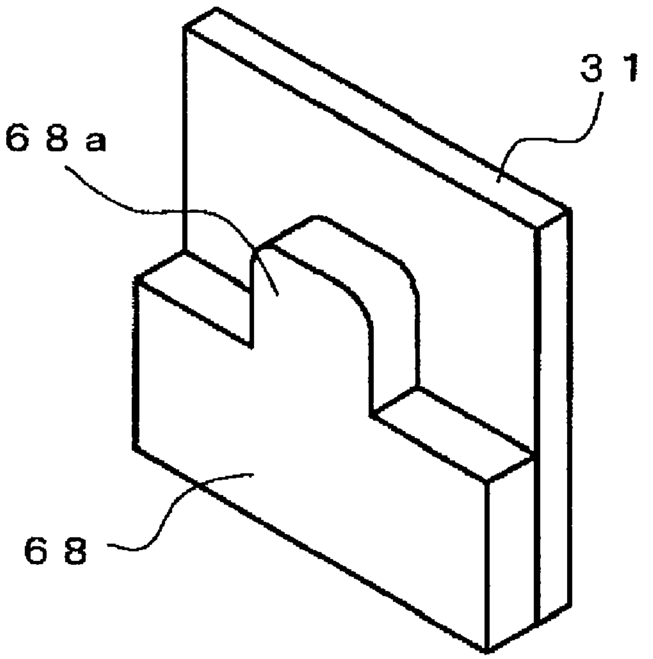
FIG. 19 is a perspective view showing an auxiliary pusher used in the cassette shown in FIG. 17.

FIG. 17 shows a configuration wherein in addition to the fall prevention rod 66 (not essentially necessary), an auxiliary pusher 68 is provided on the pusher 31 of the cassette 26. The cassette 26 contains medicines D so-called kit medicines, each being prepared such that, as shown in FIG. 18, a thin container 69 storing an injection medication is put in a bag 70. The containers 69 are arranged in the cassette 26, and an upper half of the bag is clamped by the clamp pieces 54 to remove the kit medicine D. As shown in FIG. 19, the auxiliary pusher 68 is formed lower than the pusher 31 into a shape having a projected portion 68*a* in a central portion, and is integrated with the pusher 31. (If it is configured detachable, it can be attached only when a medicine stored in the cassette 26 is a thin and deformable type.) Portions excepting the projected portion 68*a* are positioned lower than the container 69, and only the end portions (portions chamfered into R shapes on both sides) are slightly projected from the container 69. In addition, the projected portion 68*a* is formed to have a width dimension not interfering with the clamp pieces 54 when the bag portion of the kit medicine D is clamped in a liftable state.

In the cassette 26 having the auxiliary pusher 68, only the container 69 can be appropriately compressed by the auxiliary pusher 68, and the medicines D can be appropriately aligned in the cassette 26.

In addition, in the event of medicine-D removal from the cassette 26, the bag portion is deformed to thereby enable the removal of a first medicine D when the medicine D is clamped by the clamp pieces 54. As such, in the same manner as shown in FIG. 15, after once taken up from the cassette 26, the medicine D is moved in the side direction and frontwardly removed while preventing interference with the fall prevention rod 66. Since the medicine D is thin, when the clamp pieces 54 clamp the medicine D, interference with a portion of the next or adjacent medicine D is unavoidable (even if it is attempted to avoid such interference, the medicine holding member 40 needs to be moved with high accuracy—which is impractical in terms of costs). In the course of clamping the medicine D by the clamp pieces 54, the bag portion expands in forward and rearward directions (longitudinal direction of the cassette 26), such that only the first medicine D thus clamped can be removed.

In this manner, the medicines D are serially removed from the cassette 26. When removing a last medicine D, only the projected portion 68*a* on the center exists in a movement path of the clamp pieces 54, hence obviating the case of interference with the clamp pieces 54. Consequently, even in the case that such thin medicines D are stored in the cassette 26, they can be smoothly discharged up to the last one.

Figure 25:
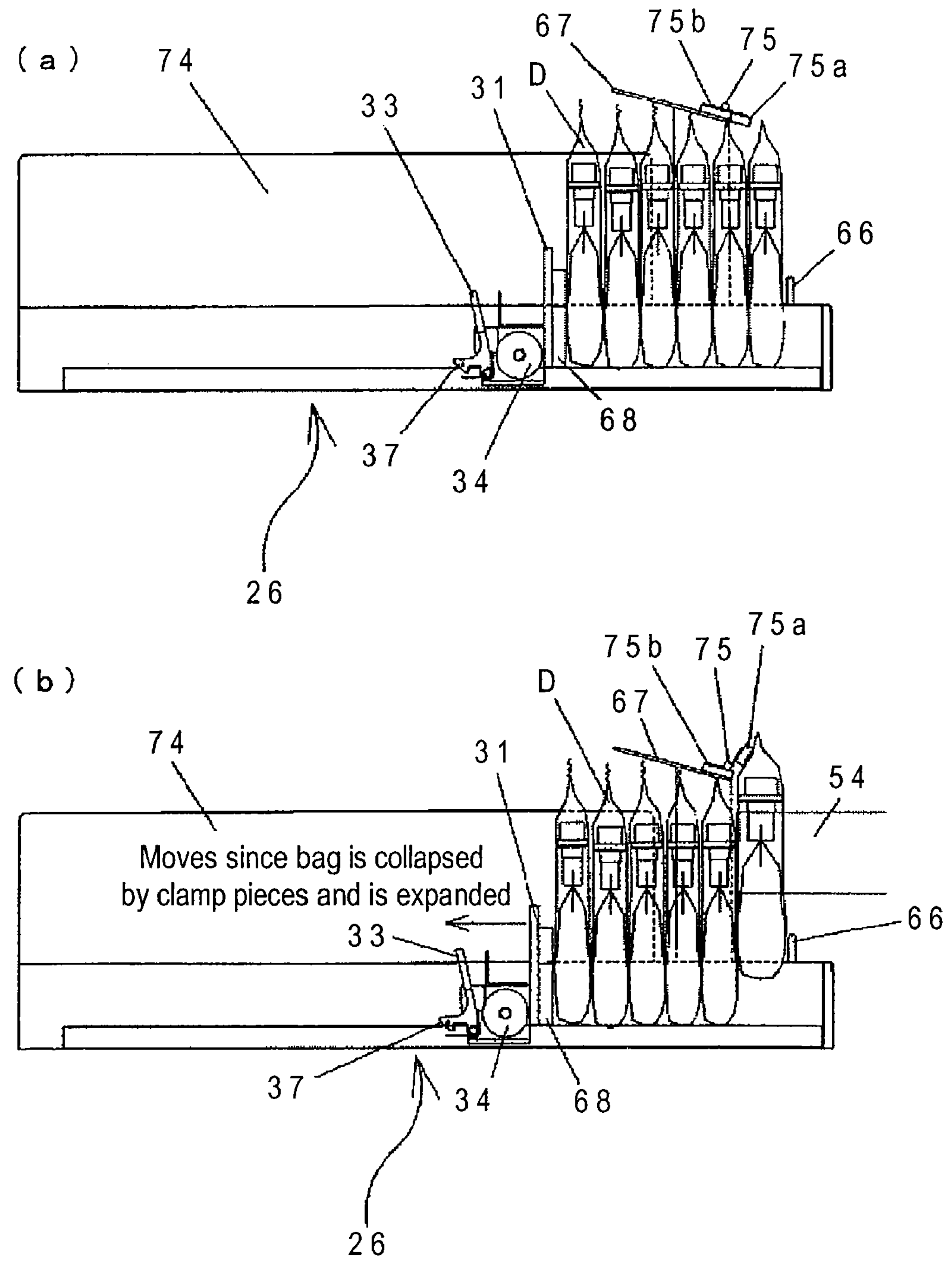
FIG. 25(*a*) is a side view showing an application example wherein the guide plate is mounted to the cassette shown in FIG. 17, and FIG. 25(*b*) is a side view showing an operational state thereof.

FIGS. 25(*a*) and 25(*b*) are views showing an application example wherein the guide plate 67 is provided to prevent the bag portion of the next medicine D from being taken up. Referring to FIG. 25(*a*), the bag-shaped medicines D are aligned in the cassette 26, wherein the pusher 31 of the medicine push-out member 30 compresses the bag-shaped medicines D from the rear side thereof toward a removal portion. Since the bag-shaped medicines D are devoid of stability, the configuration has an auxiliary guide plate 74 in the width direction of the cassette 26. As shown in the drawings, in the vicinity of the removal portion, the guide plate 67 is provided tilted in the shape bent in such a manner as to press contact the cassette bottom wall in the conveyance course in the upper position of the medicines D. An end portion of the guide plate 67 has a hinge 75 configured of a holding portion 75*a* for holding the medicine D and a fixing portion 75*b* for fixing to the guide plate 67. The hinge 75 is urged by a spring (not shown) along the direction of the bottom wall of the cassette 26, thereby preventing the medicine D from being pushed out.

In the present application example having the guide plate 67, in the course of clamping the medicine D by the clamp pieces 54, the bag portion expands in the forward and rearward directions (longitudinal direction of the cassette 26). Accordingly, when removing only the first medicine D clamped, the next medicine D is stored below the guide plate 67, and further, also a portion of the medicine D expanded as a result of being clamped is removed with the clamp pieces 54 from the cassette 26 in the state of the portion engaging a lower portion of the guide plate 67, thus resulting in the risk that the bag of the medicine D may burst. Nevertheless, as shown in FIG. 25(*b*), in the event of removal, since the expanded portion of the medicine D contacts with the holding portion 75*a* to thereby be rotated, no cases take place wherein the bag of the medicine D is damaged and also the medicine D is upwardly moved.

Figure 20:
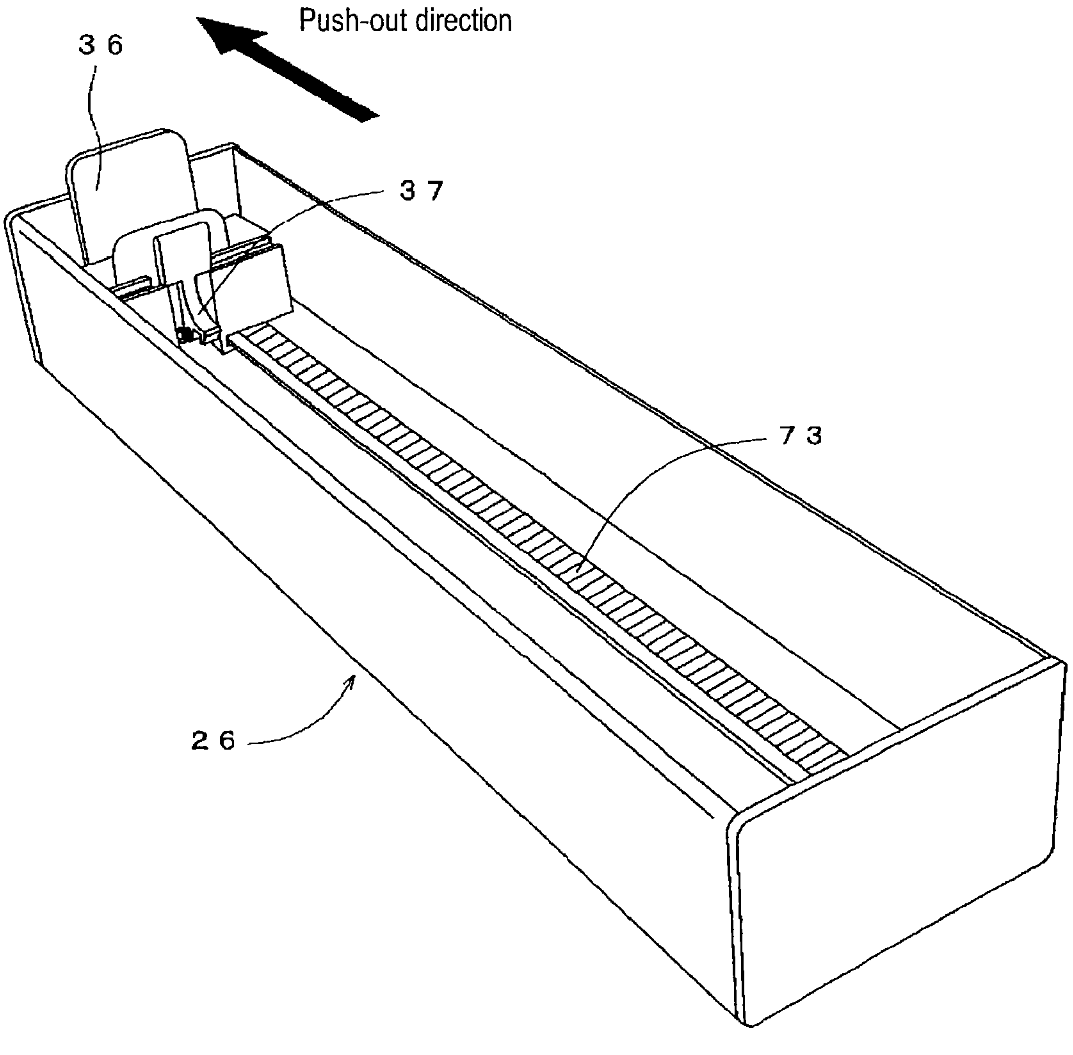
FIG. 20 is a perspective view showing a cassette in accordance with another embodiment.
Figure 21:
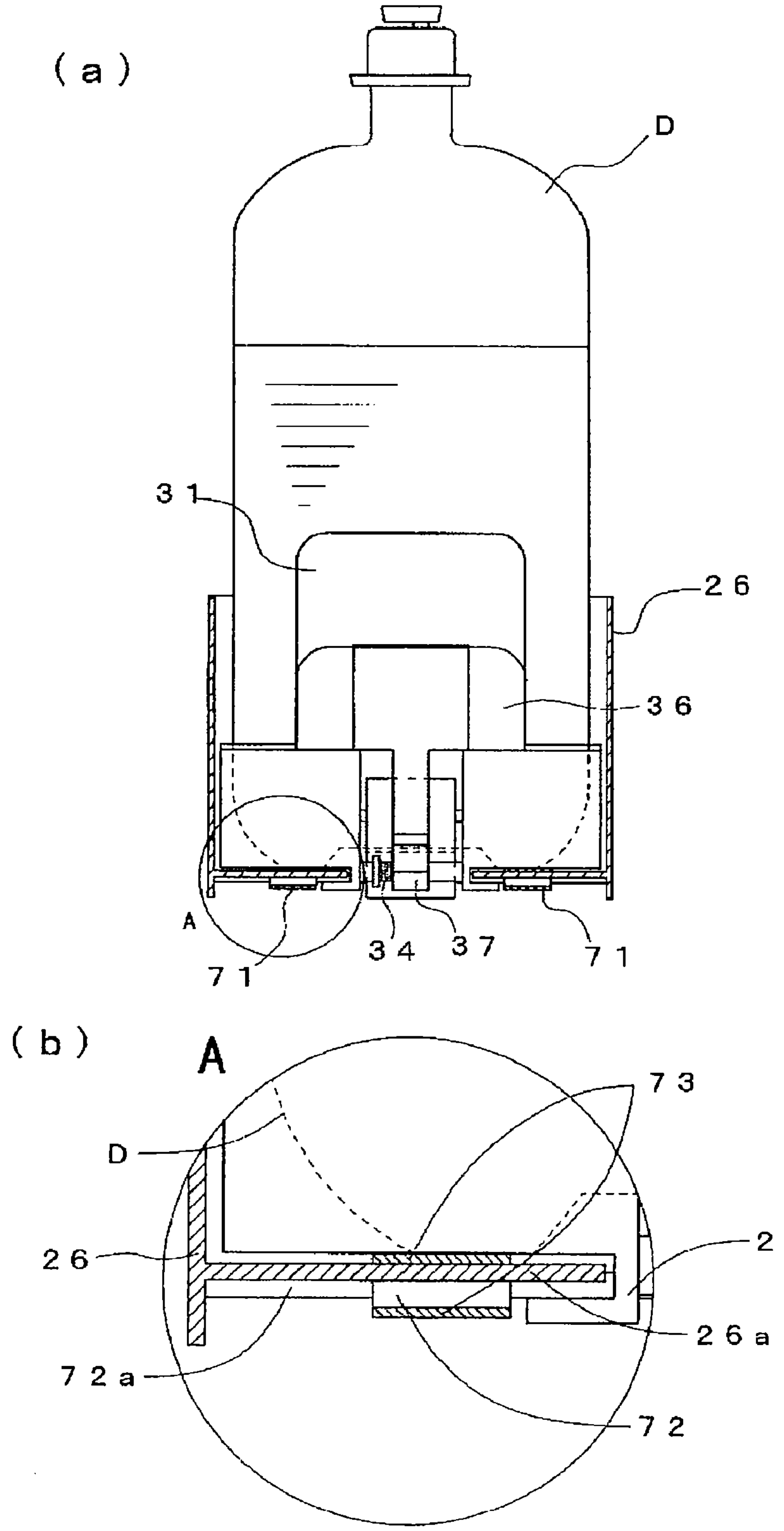
FIG. 21(*a*) is a front sectional view of the cassette shown in FIG. 20, and FIG. 21(*b*) is an enlarged view of the part A therein.

FIG. 20 shows a configuration having a moving support portion 71 on the bottom wall of the cassette 26. In the example shown in FIG. 20, as the moving support portion 71, a configuration is employed wherein endless belts 73 are wound on between pulleys 72. The pulleys 72, respectively, are disposed in both end portions on both sides of the cassette 26. The endless belts 73 are wound on the respective pulleys 72 positioned on both sides, and are disposed in an exposed manner on two tracks on the bottom wall of the cassette 26. As shown in FIG. 21(*a*) and in FIG. 21(*b*) in more detail, cutouts (not shown) are formed in both end portions of the bottom wall of the cassette 26, wherein shifting of the endless belt 73 takes place via the cutout between a portion exposed on the bottom wall of the cassette 26 and a portion in an inner spacing on the bottom wall side of the cassette 26. The pulleys 72 are each rotatably provided about a rotation shaft 72*a* in the center, wherein when forces act on the endless belt 73, the endless belt 73 is enabled an easy perform of circular movement. Sawtooth-shaped protrusions and recesses, or irregular portions are formed on the surface of the respective endless belt 73 to reduce the area of contact with the bottom wall of the medicine D. In addition, in the example of FIG. 20, the medicine D stored in the cassette 26 has a structure wherein a bottom-wall central portion is recessed and only the peripheral portions can be contacted. For this reason, the two endless belts 73 are provided only for portions contactable with the bottom walls of the medicine D. In addition, since the endless belts 73 are thus provided on two tracks, even when the medicine D is rotated in the event of removal of the medicine D, one of the endless belts 73 follows. This makes it possible to prevent the medicine D from falling. Other configurations are similar to those of the cassette 26 shown in FIG. 4.

Figure 22:
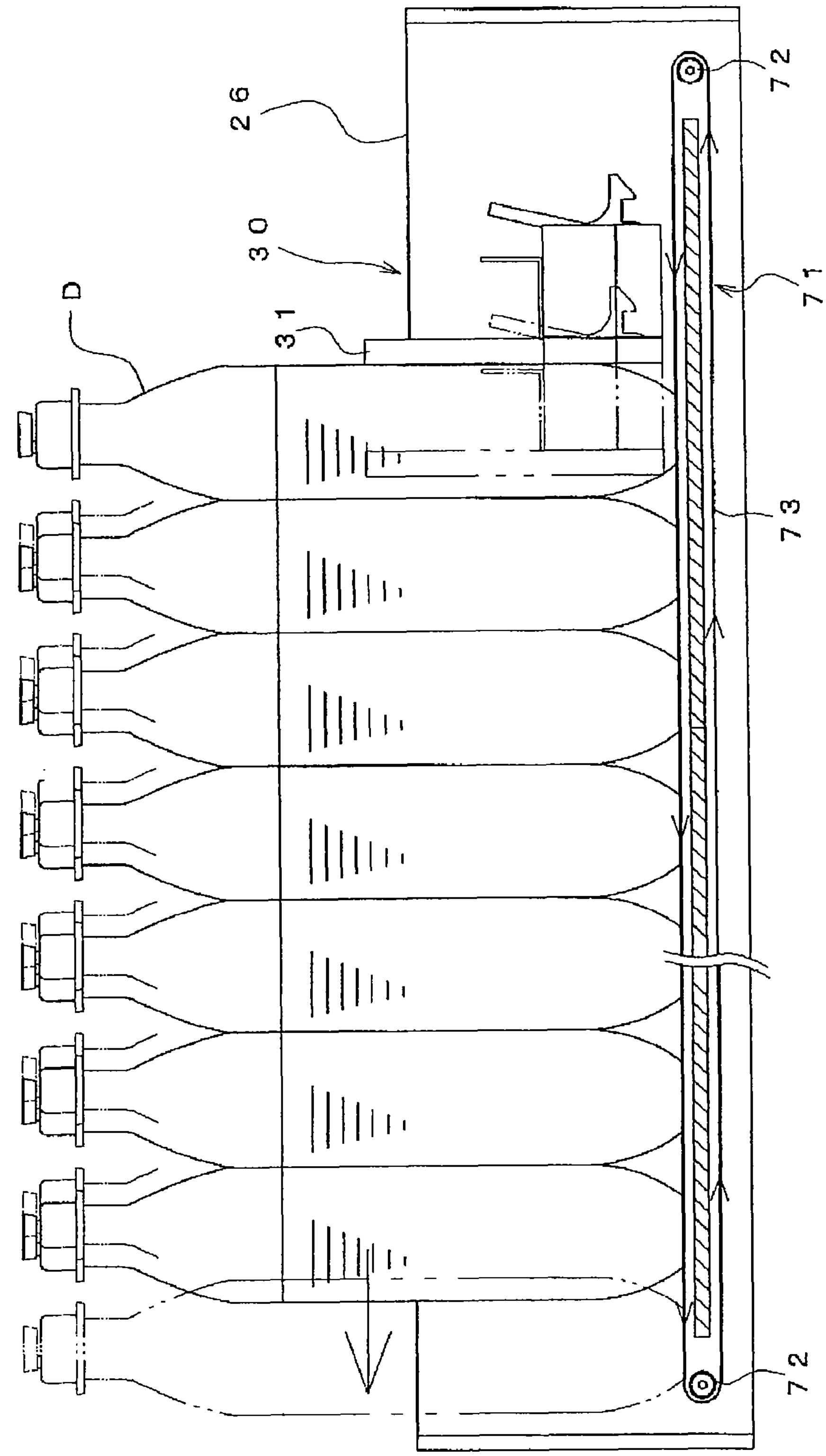
FIG. 22 is a side cross sectional view of the cassette shown in FIG. 20.
Figure 23:
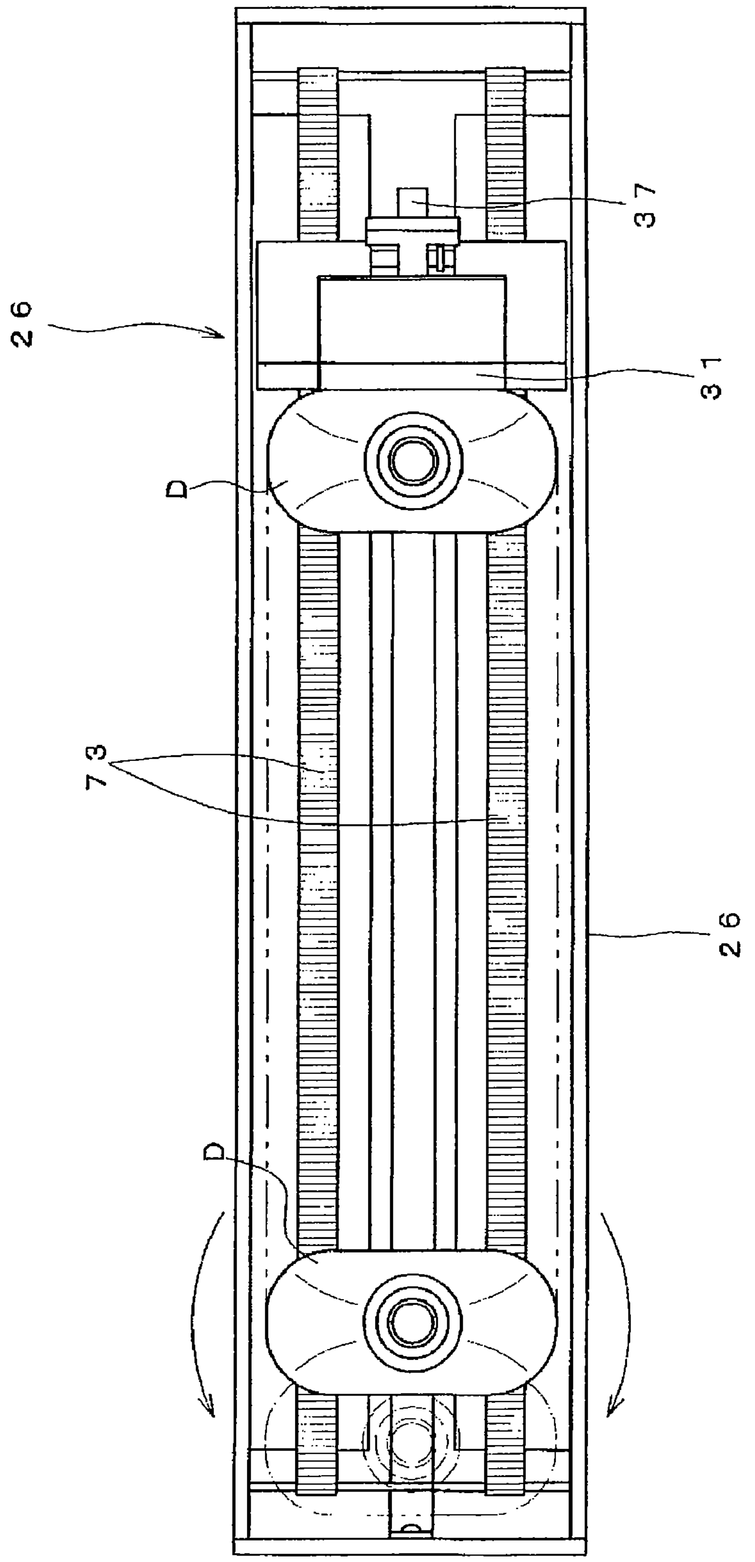
FIG. 23 is a plan view of the cassette shown in FIG. 20.

According to the cassette 26 thus configured, as shown in FIG. 22, the medicines D are aligned and stored in the cassette 26, and when the medicine is serially removed from the removal side, the remaining medicines D are pushed out to the removal side. The portions of the endless belts 73 exposed on the bottom wall of the cassette 26 are provided on two lines, and the irregular portions are formed on the surfaces thereof to reduce the area of contact with the medicine D. Accordingly, the medicine D smoothly slides and concurrently moves to the removal side. When friction forces acting between the bottom wall of the medicine D and the endless belt 73 are great, the endless belt 73 circularly moves before the medicine D falls. Further, since the two endless belts 73 are provided, even when forces in a rotation direction as shown by the arrow direction in FIG. 23 act on the medicine D, one of the endless belts 73 follows to increase the amount of movement of the medicine. Consequently, falling of the medicine D can be securely prevented.

REFERENCE NUMERALS

1. Device body
2. Shelf member
2*a*. First shelf member
2*b*. Second shelf member
3. Medicine conveyance member
4. Tray conveyance line
5. Tray
6. Guide member
6*a*. First guide member

6*b*. Second guide member
7. Guide wall
7*a*. Intermediate rail portion
8. Guide rail
9. First guide surface
10. Second guide surface
11. Support roller
12. Stopper
13. First rail portion
14. Second rail portion
15. Support wall
15*a*. Abutment receiving portion
16. Pivot
16*a*. Spring
17. Anchor receiving section
18. Support rail section
19. Shelf positional shift sensor
20. Box body
21. Medicine storage portion
22. Handle
23. Lock member
24. Anchoring portion
25. Guide roller
26. Cassette
27. Groove portion
28. Support plate
29. Anchoring hole
30. Medicine push-out member
30*a*. Casing
31. Pusher
31*a*. Protrusion
32. Constant load spring
33. Anchoring lever
34. Drum
35. Spring portion
36. Operation section
37. Anchoring tab
38. Horizontal guide bar (horizontal guide portion)
39. Vertical guide bar (vertical guide portion)
40. Medicine holding member
41. Drive motor
41*a*. Pulley
41*b*. Belt
42. Support member
43. Frontward-rearward moving member
44. Clamping member
45. Guide receiving portion
46. First guide shaft
47. First screw thread
48. First motor
48*a*. Pulley
48*b*. Belt
49. Slide table
49*a* Roller
50. Side plate portion
51. Pivotal plate
52. Second guide
53. Second screw thread
54. Clamp piece
54*a*. Outer frame
54*b*. Resilient guide portion
55. Pressure receptor portion (pressure receptor portion)
56. First lock plate (first lock portion)
56*a*. Roller
56*b*. Lock pin
57. Second lock plate (second lock portion)
58. Lock hole
58*a*. Arcuate portion
58*b*. First lock recessed portion
58*c*. Second lock recessed portion
59. Second motor
59*a*. Pulley
59*b*. Belt
60. Conveyance roller
61. Control device
62. Server
63. Input device
64. Storage device
65. Driving device
66. Fall prevention rod
67. Guide plate
68. Auxiliary pusher
68*a*. Projected portion
69. Container
70. Bag
71. Moving support portion
72. Pulley
73. Endless belt
74. Auxiliary guide plate
75. Hinge
75*a*. Holding portion
75*b*. Fixing portion
D. Medicine
d1. Body portion
d2. Leg portion

The invention claimed is:

1. A medicine dispensing device comprising:
a device body having a front face; and
a medicine conveyance member that conveys medicines arranged in a plurality of lines in the device body one by one,
wherein the medicine conveyance member includes a medicine holding member movable in a horizontal direction and a vertical direction, the medicine holding member including:
a support member;
a frontward-rearward moving member that is supported by the support member and that reciprocatingly moves in a frontward-rearward direction normal to the front face of the device body; and
a clamping member including a pair of clamp pieces that are supported by the frontward-rearward moving member to pivot between a vertical position and a horizontal position and that are capable of clamping one of said medicines,
wherein the medicines are stored in each of a plurality of cassettes juxtaposed in the device body, the cassette comprising:
a pusher that urges the stored medicines to a removal side of the cassette; and
a moving support portion operatively coupled with the cassette, the moving support portion abutting the stored medicines and being reciprocatingly movable, and
wherein the clamping member further includes:
a pivotal plate that supports the clamp pieces to move close to or away from one another and to be pivotable; and
a urging means that urges the pivotal plate to the vertical position, wherein the pivotal plate includes a pressure receptor portion that, when moving down the clamping member, abuts a compression portion formed in the device body to thereby cause the clamping member to rotate to the horizontal position against an urging force exerted by the urging means.

2. The medicine dispensing device of claim 1, wherein the moving support portion includes an endless belt wound onto and between pulleys.

3. The medicine dispensing device of claim 1, wherein each of the clamp pieces comprises:

an outer frame that includes an outer profile formed along an outer peripheral shape of the medicine; and a resilient support portion that is disposed in the outer frame and that press-contacts an outer periphery of the medicine.

4. The medicine dispensing device of claim 1, wherein the clamping member further includes:

a first lock member actuated by movement along a projected portion formed in the device body for reciprocating movement of the first lock member in the horizontal direction; and a second lock member that disallows or allows the clamp pieces to pivot in accordance with the reciprocating movement of the first lock member.

5. The medicine dispensing device of claim 1, further comprising:

a storage device that stores a width in a juxtaposed direction of each of the cassettes; and a controller unit that references medicine data stored in the storage device in accordance with prescription data to thereby perform drive control of the medicine conveyance member, wherein the controller unit adjusts a gap between the clamp pieces in accordance with the width of the cassette stored in the storage device when the medicine conveyance member is driven and controlled to dispense the medicine in accordance with the prescription data to thereby reduce a dimension of movement when the medicine is clamped by the clamp pieces.

6. The medicine dispensing device of claim 1, further comprising:

a first spacing defined in the device body on a front side of the medicines aligned and disposed within the device body, the clamping member being movable within the first spacing when the clamping member is in the vertical position; and a second spacing defined in the device body below the medicines disposed within the device body, the clamping member being rotatable between the horizontal position and the vertical position within the second spacing.

7. A medicine dispensing device, comprising:

a device body having a front face; and a medicine conveyance member that conveys medicines arranged in a plurality of lines in the device body one by one, wherein the medicine conveyance member includes a medicine holding member movable in a horizontal direction and a vertical direction, wherein the medicines are stored in each of a plurality of cassettes juxtaposed in the device body, the cassette comprising:

a pusher that urges the stored medicines to a removal side of the cassette; and a moving support portion operatively coupled with the cassette, the moving support portion abutting the stored medicines and being reciprocatingly movable, and wherein the medicine dispensing device further comprises:

a storage device that stores a width in a juxtaposed direction of each of the cassettes; and a controller unit that references medicine data stored in the storage device in accordance with prescription data to thereby form drive control of the medicine conveyance member, wherein the medicine holding member includes:

a support member;

a frontward-rearward moving member that is supported by the support member and that reciprocatingly moves in a frontward-rearward direction normal to the front face of the device body; and a clamping member including a pair of clamp pieces that are supported by the frontward-rearward moving member to pivot between a vertical position and a horizontal position and that are capable of clamping one of said medicines, wherein the controller unit adjusts a gap between the clamp pieces in accordance with the width of the cassette stored in the storage device when the medicine conveyance member is driven and controlled to dispense the medicine in accordance with the prescription data to thereby reduce a dimension of movement when the medicine is clamped by the clamp pieces.

8. The medicine dispensing device of claim 7, wherein the clamping member further includes:

a pivotal plate that supports the clamp pieces to move close to or away from one another and to be pivotable; and an urging means that urges the pivotal plate to the vertical position, wherein the pivotal plate includes a pressure receptor portion that, when moving down the clamping member, abuts a compression portion formed in the device body to thereby cause the clamping member to rotate to the horizontal position against an urging force exerted by the urging means.

9. The medicine dispensing device of claim 7, wherein the clamping member further includes:

a first lock member actuated by movement along a projected portion formed in the device body for reciprocating movement of the first lock member in the horizontal direction; and a second lock member that disallows or allows the clamp pieces to pivot in accordance with the reciprocating movement of the first lock member.

10. The medicine dispensing device of claim 7, further comprising:

a first spacing defined in the device body on a front side of the medicines aligned and disposed within the device body, the clamping member being movable within the first spacing when the clamping member is in the vertical position; and a second spacing defined in the device body below the medicines disposed within the device body, the clamping member being rotatable between the horizontal position and the vertical position within the second spacing.

* * * * *